United States Patent [19]
Yamagishi et al.

[11] Patent Number: 5,519,874
[45] Date of Patent: May 21, 1996

[54] APPLICATION EXECUTION CONTROL METHOD AND SYSTEM FOR SERVICING SUBSCRIBERS VIA A SWITCHBOARD CONNECTED TO A COMPUTER USING AN APPLICATION MANAGEMENT TABLE

[75] Inventors: Junko Yamagishi, Kodaira; Takuo Tsuzuki, Hiratsuka; Noboru Mizuhara, Kawasaki; Tetsuo Sakuma, Sagamihara; Tomoaki Tsunoda, Kawasaki, all of Japan

[73] Assignees: Hitachi, Ltd.; Hitachi Microcomputer System, Ltd., both of Tokyo, Japan

[21] Appl. No.: 668,208

[22] Filed: Mar. 12, 1991

[30] Foreign Application Priority Data

Mar. 13, 1990 [JP] Japan .................................. 2-061799

[51] Int. Cl.⁶ ................................................. G06F 13/00
[52] U.S. Cl. .................. 395/800; 395/200.03; 395/311; 395/650; 379/84; 379/320; 364/238.1; 364/230.3; 364/DIG. 1
[58] Field of Search ................................ 395/800, 650, 395/325, 200, 311, 200.3; 370/79, 85.7; 379/188, 84, 242, 165, 258, 308, 320, 142

[56] References Cited

U.S. PATENT DOCUMENTS

| | | | |
|---|---|---|---|
| 4,603,418 | 7/1986 | Townsend | 370/85 |
| 4,882,727 | 11/1989 | Williams et al. | 370/79 |
| 4,955,019 | 9/1990 | Mizuhara et al. | 370/85.7 |
| 4,956,861 | 9/1990 | Kondo | 379/142 |
| 4,975,941 | 12/1990 | Morganstein et al. | 379/88 |
| 5,043,881 | 8/1991 | Hamazaki | 395/700 |
| 5,155,857 | 10/1992 | Kunisaki et al. | 395/800 |
| 5,195,129 | 3/1993 | Yazawa et al. | 379/96 |

FOREIGN PATENT DOCUMENTS

| | | |
|---|---|---|
| 1157191 | 6/1989 | Japan . |
| 1157192 | 6/1989 | Japan . |

OTHER PUBLICATIONS

J. Shah et al., "Application of a new network concept for faster service employment", CH2538–7/88/0000, 1988, pp. 1327–1331.
J. Rix–Brown, "The telephone and the terminal on your desk join forces", 1989, pp. 331–341.

*Primary Examiner*—Alyssa H. Bowler
*Assistant Examiner*—Alpesh M. Shah
*Attorney, Agent, or Firm*—Antonelli, Terry, Stout & Kraus

[57] ABSTRACT

A subscriber terminal service system, which has a switchboard connected to a plurality of subscriber terminals and a computer connected with the switchboard and executes services to subscribers, has the functions of setting a flag indicative of the possibility/impossibility of the execution of an application on the basis of a message sent from the computer, referring to the flag in response to a service request sent from the subscriber terminal to determine whether or not the execution of the requested application should be permitted, sending a control message to the switchboard when the condition of possibility/impossibility of the execution of an application on the computer, and changing the content of the flag in the switchboard on the basis of the control message. The start or stop of any application executed in the computer is made through a console device connected with the computer or by a scheduler provided in the computer.

30 Claims, 26 Drawing Sheets

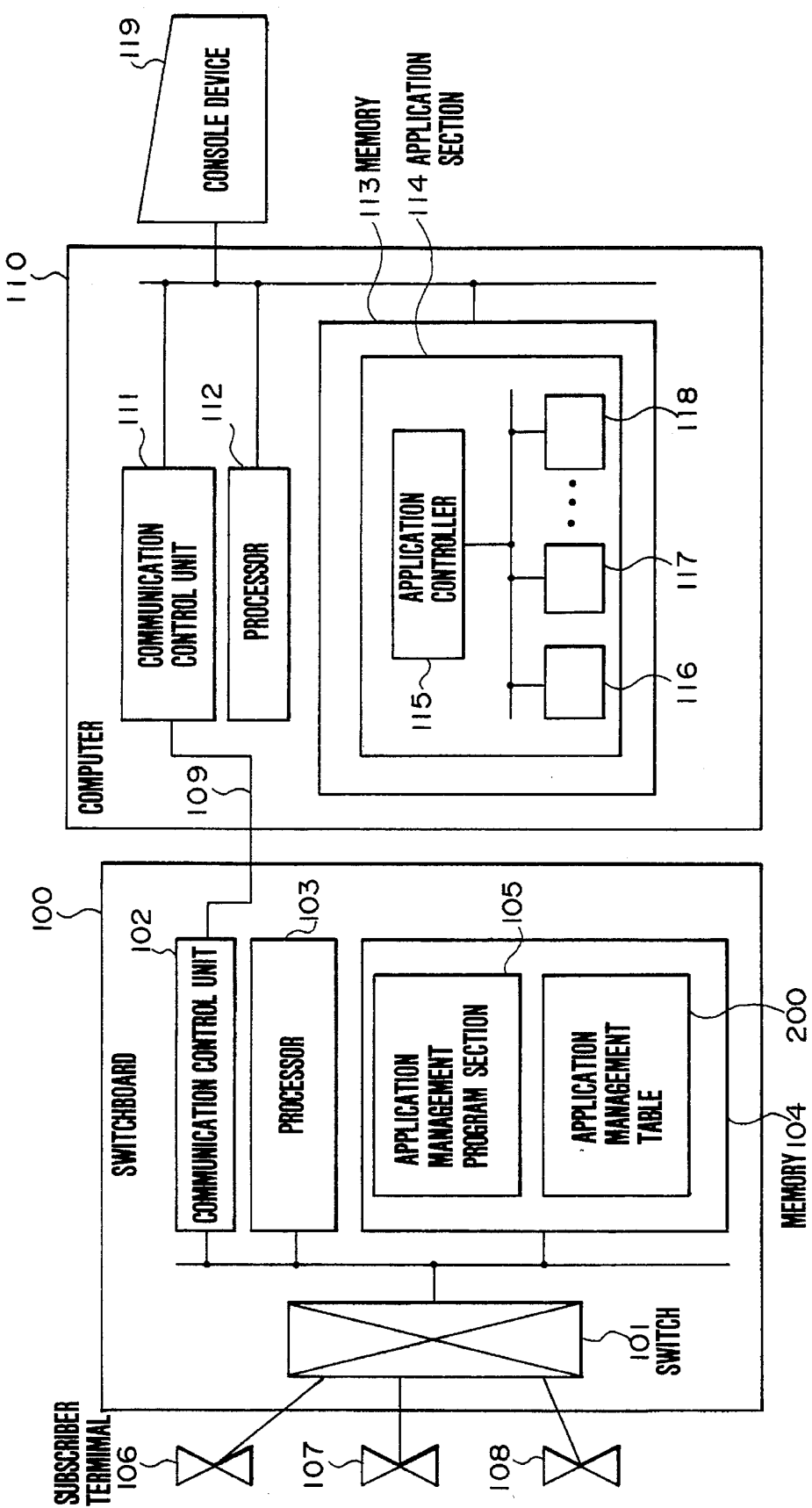

FIG. 2 APPLICATION MANAGEMENT TABLE 200
| APPLICATION NAME | START FLAG | SERVICE DIAL NUMBER |
|---|---|---|
| AP 1 | 0 | 11 |
| AP 3 | 1 | 13 |
|  |  |  |
201, 202, 203
FIG. 3 CONTROL MESSAGE COMMUNICATED
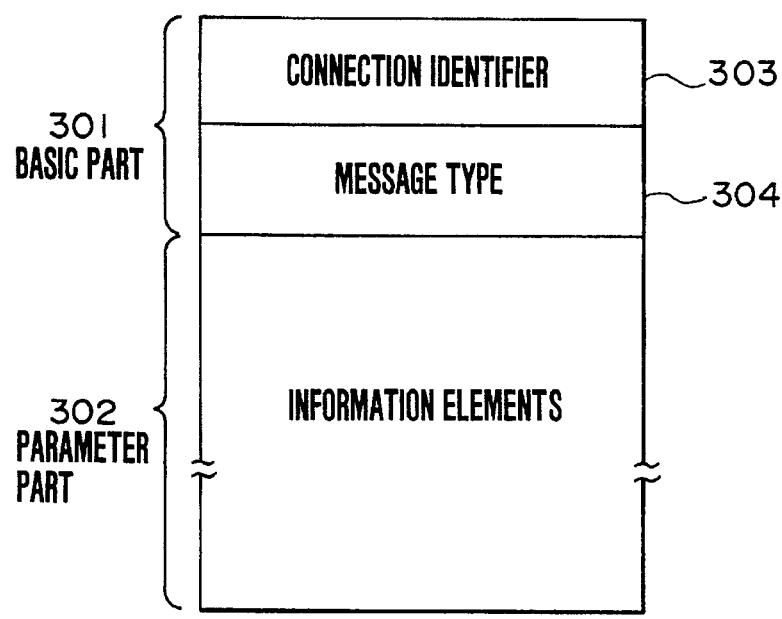
301 BASIC PART: CONNECTION IDENTIFIER (303), MESSAGE TYPE (304)
302 PARAMETER PART: INFORMATION ELEMENTS

FIG. 4 APPLICATION START MESSAGE
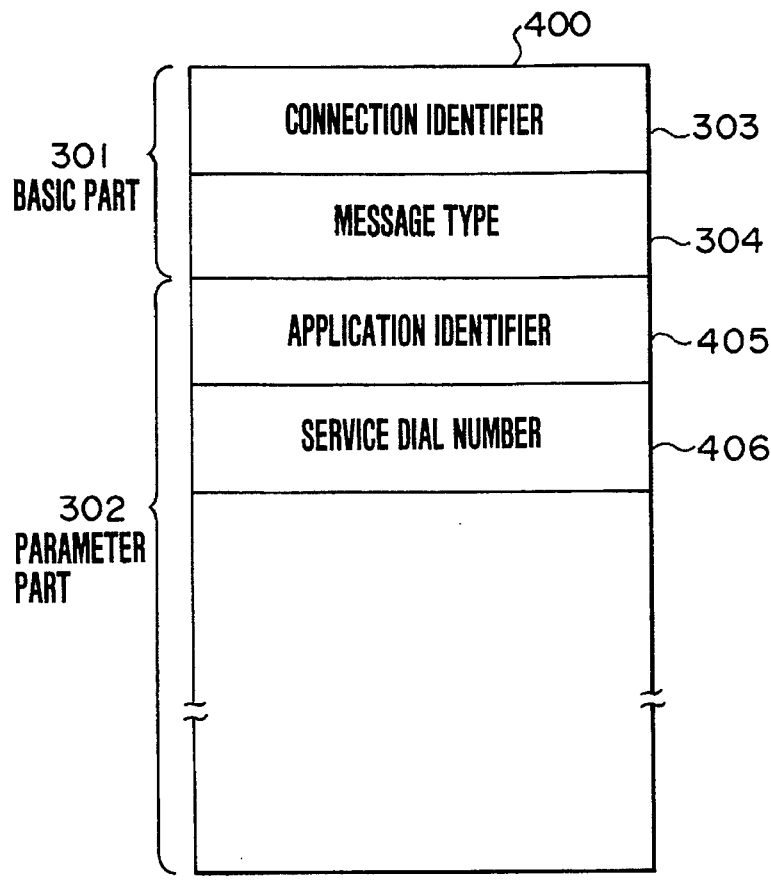
FIG. 5 APPLICATION STOP MESSAGE
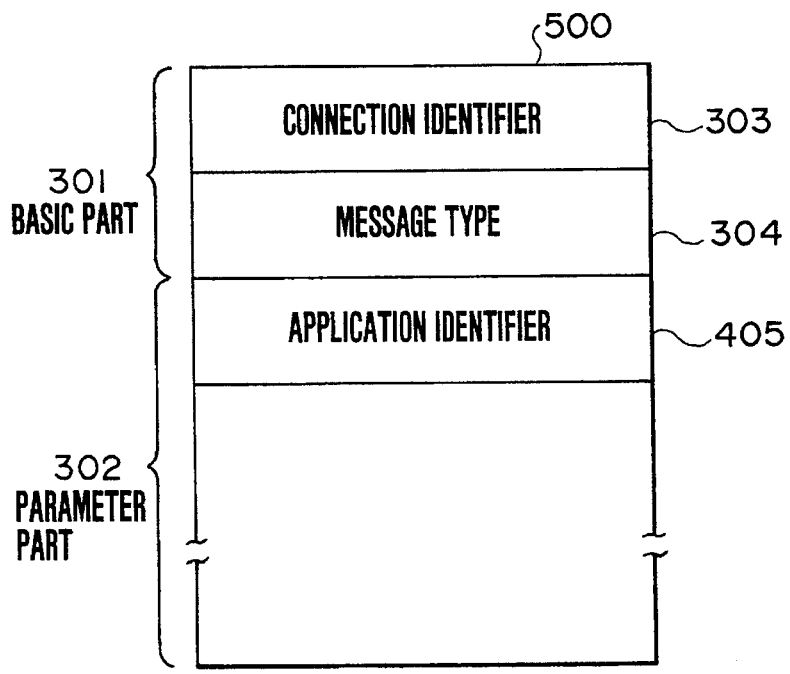

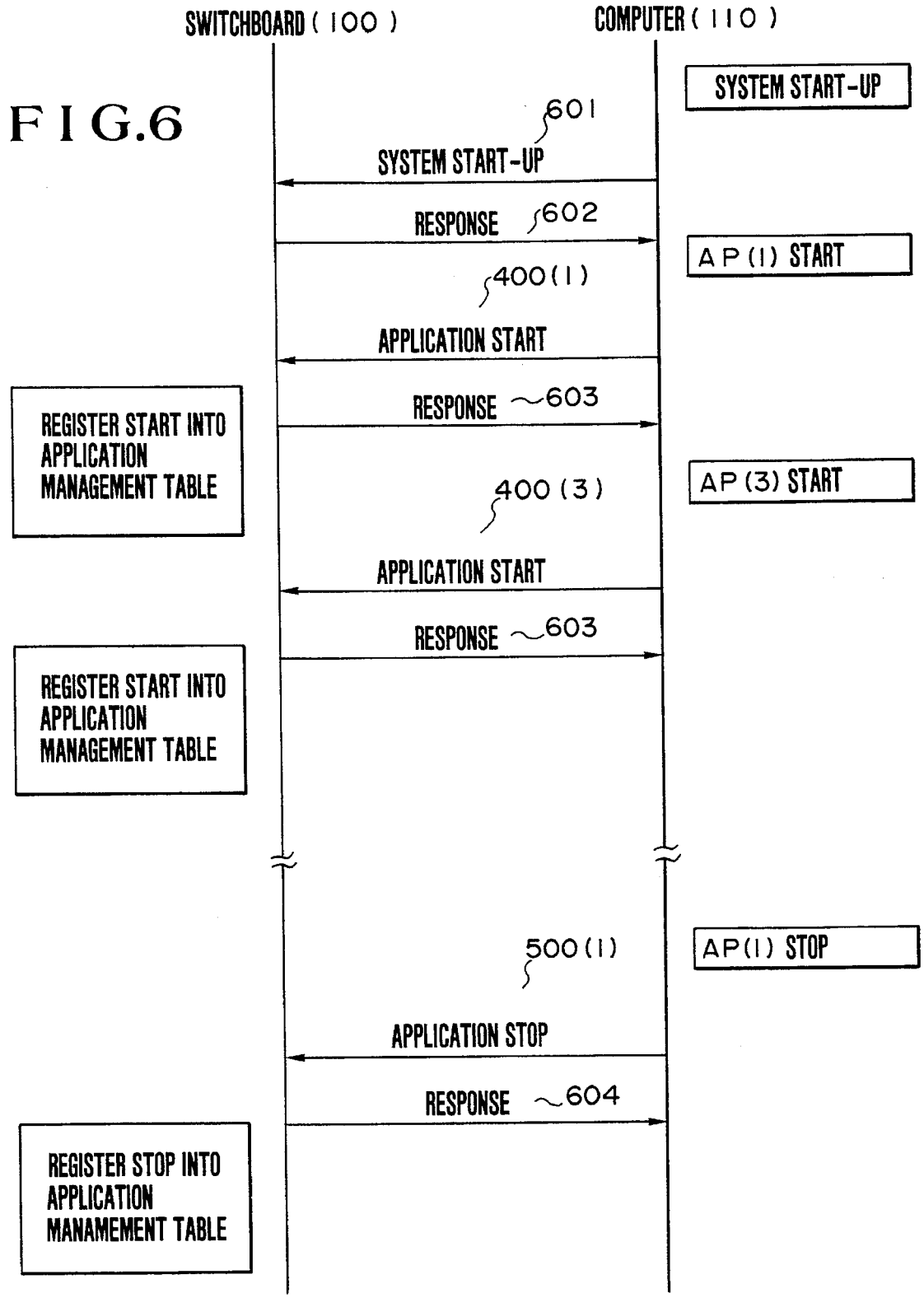

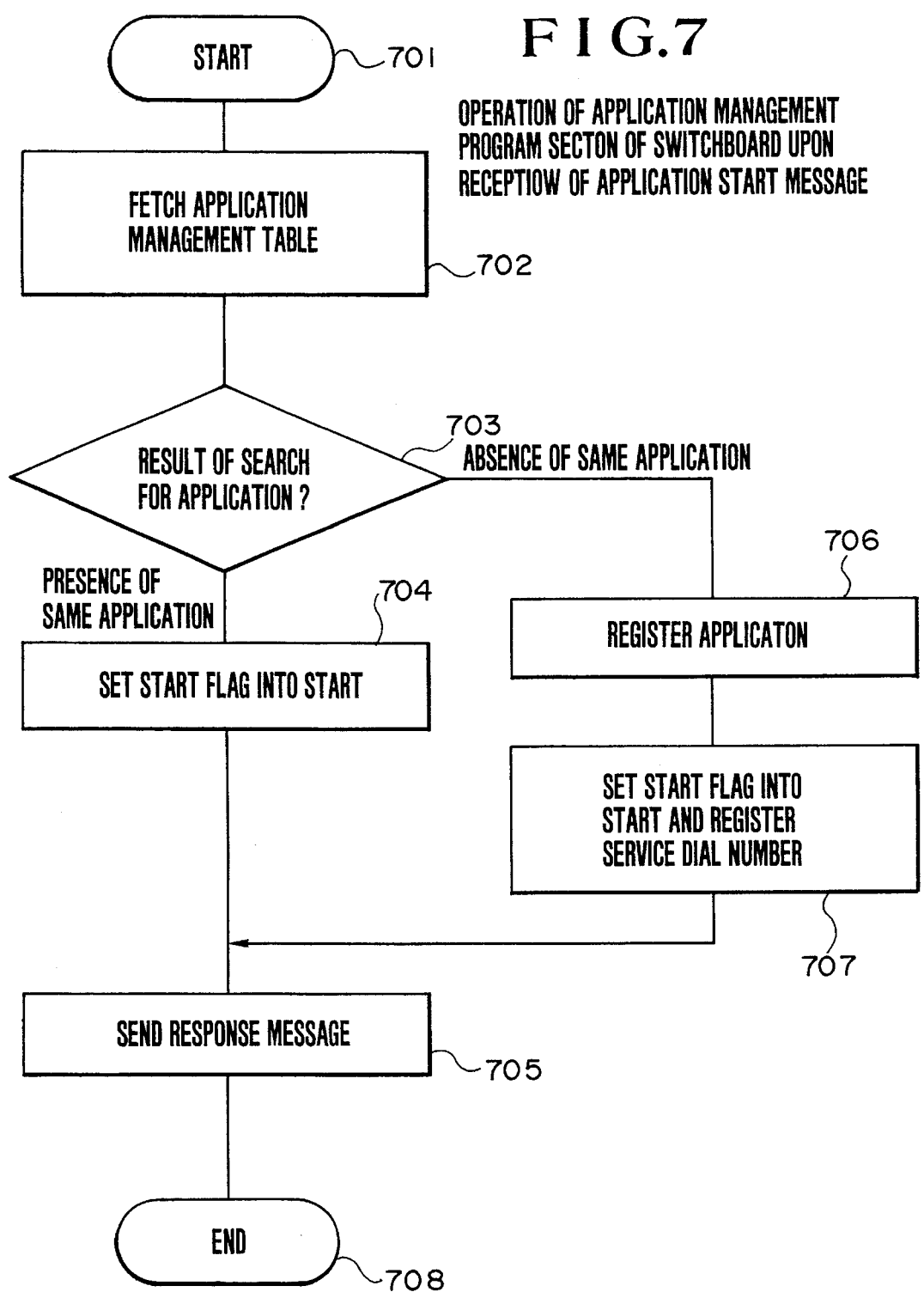

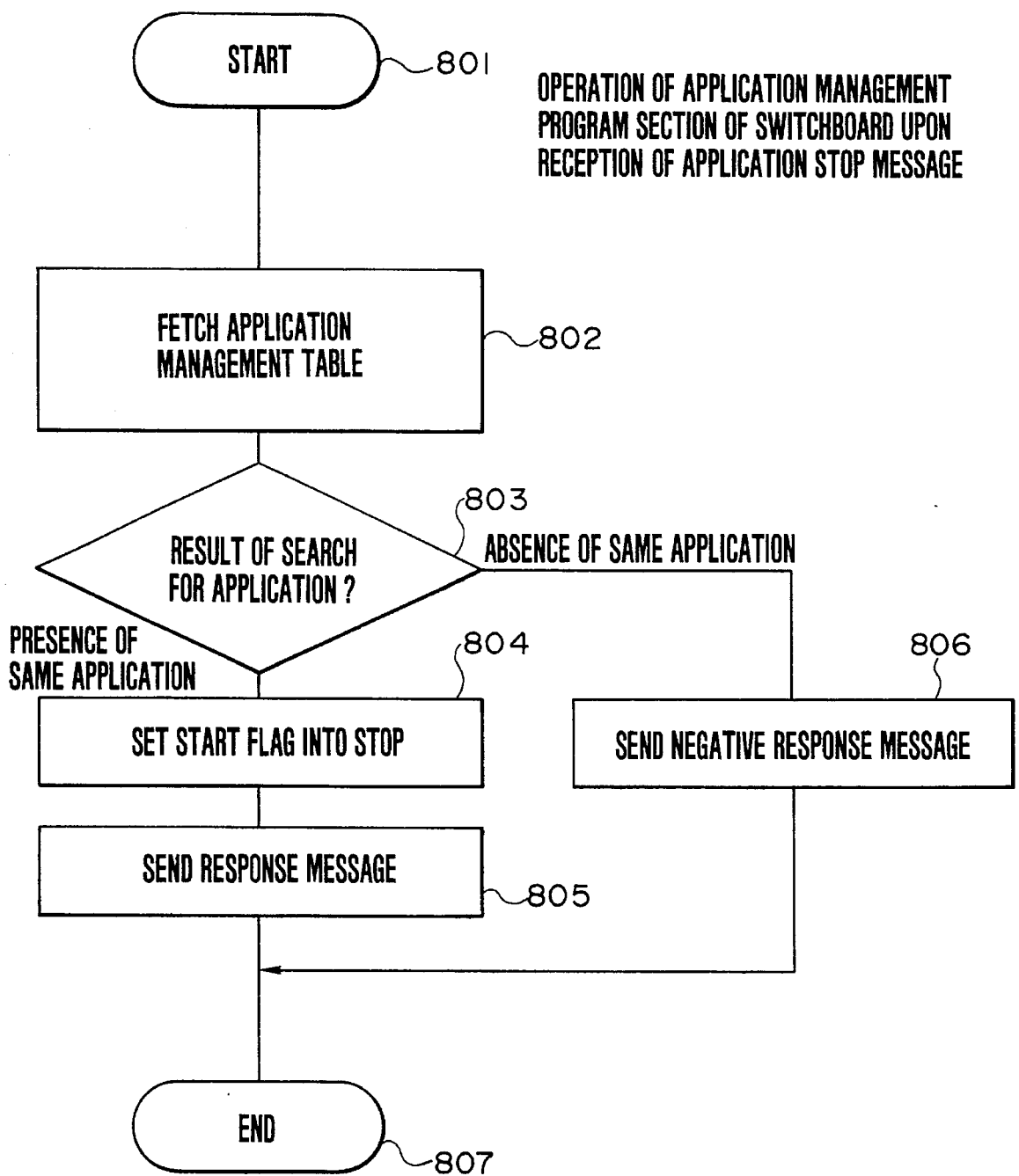

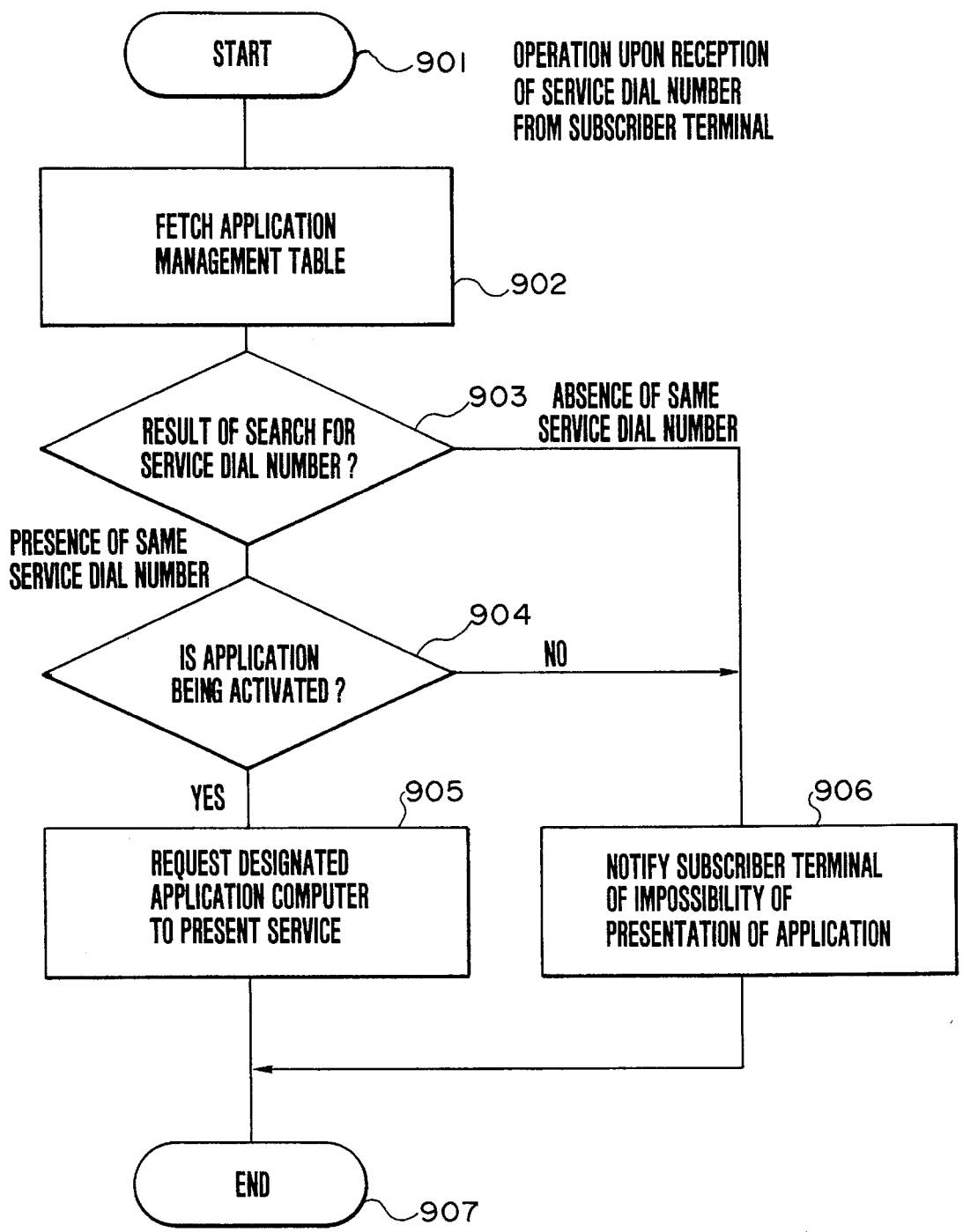

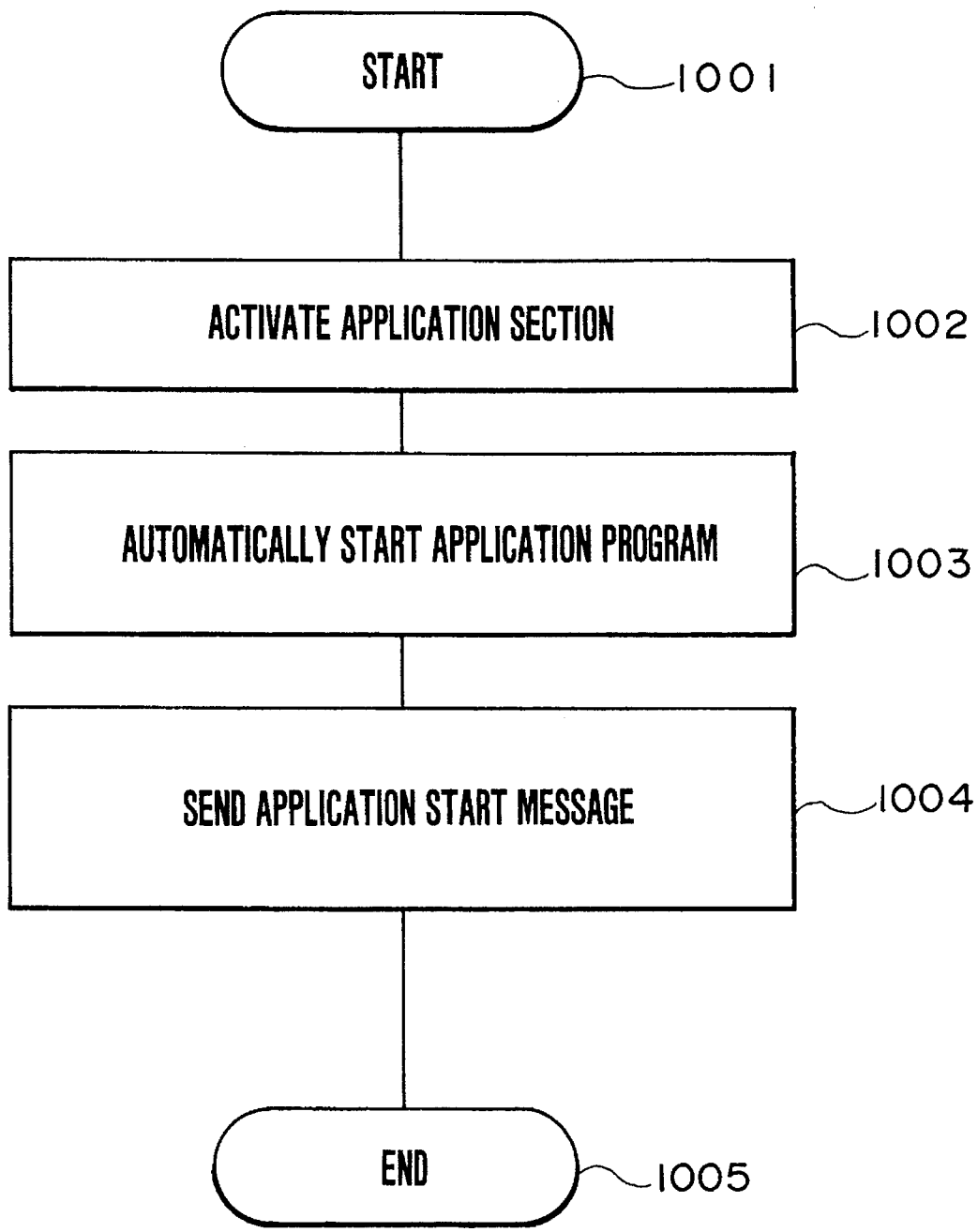

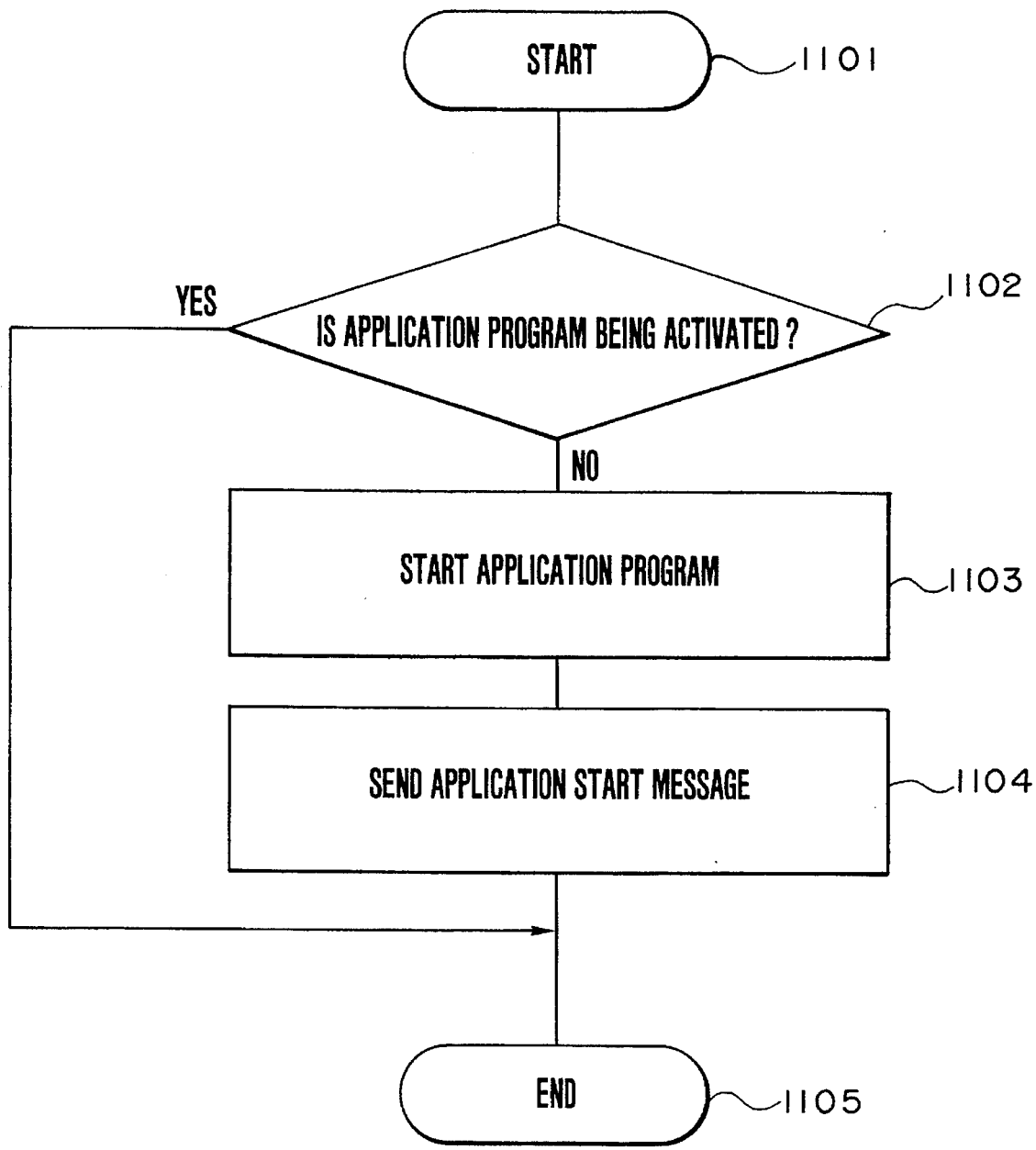

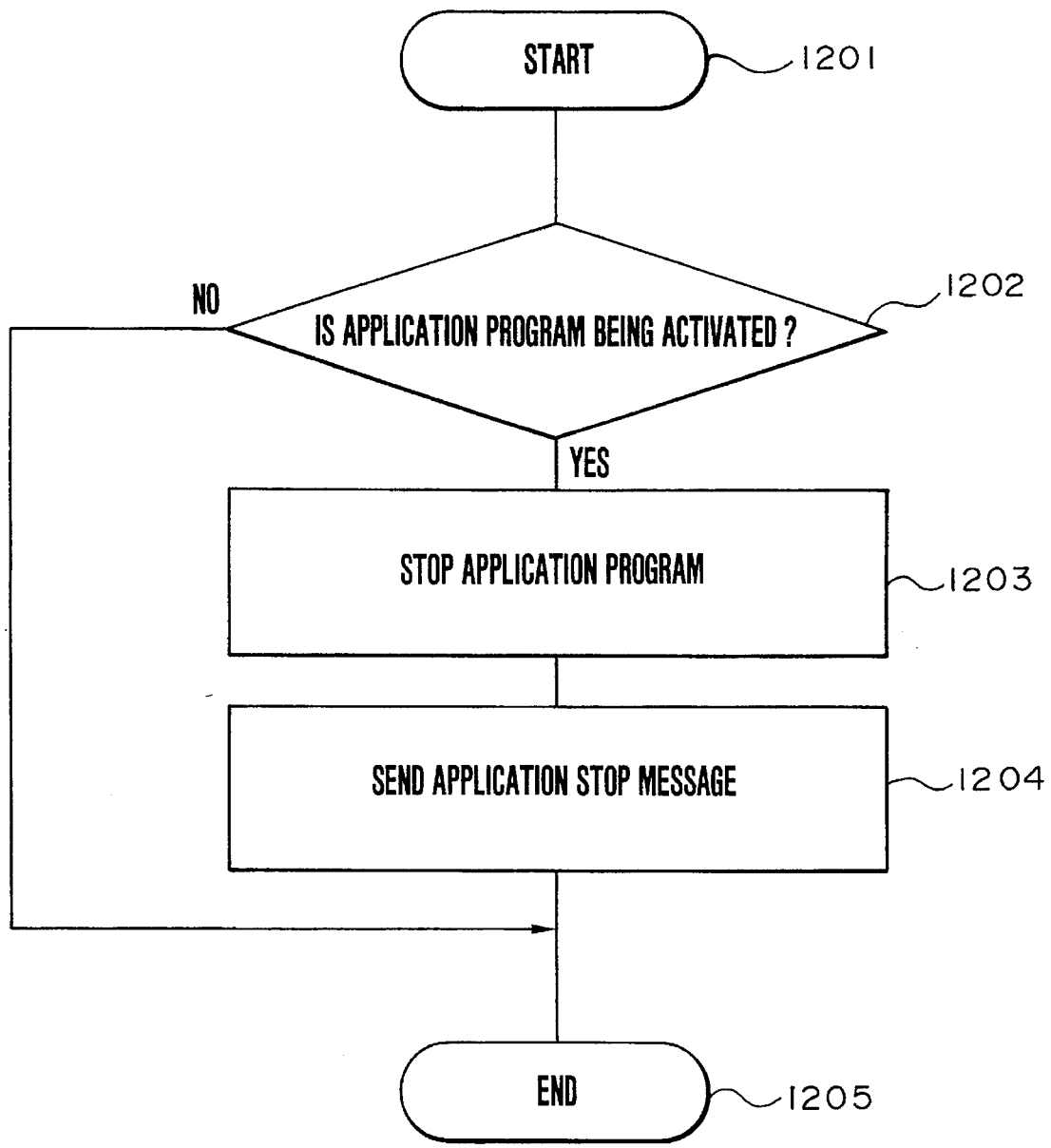

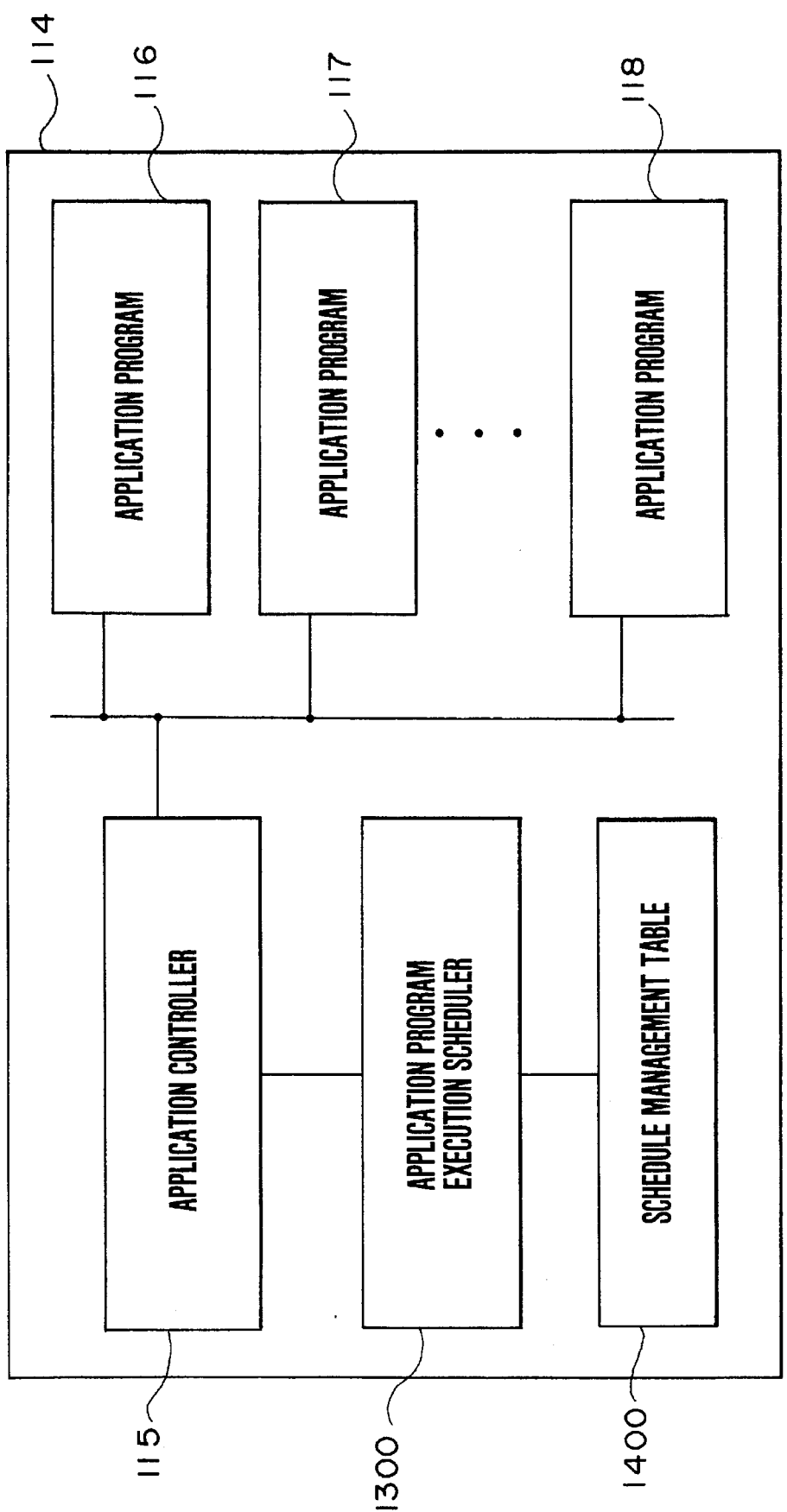

FIG. 14

SCHEDULE MANAGEMENT TABLE
USED BY SCHEDULER (FIG. 13)

| APPLICATION NAME | ACTIVATION DATE/TIME |
|---|---|
| AP 1 | 17:00 ~ 24:00 |
| AP 3 | SAT., SUN. |
|  |  |

APPLICATION PROGRAM START OPERATION BY SCHEDULER

FIG.19

DELETION OF NAME OF STOPPED
APPLICATION FROM TABLE (FIG. 20)

| APPLICATION NAME | SERVICE DIAL NUMBER |
|---|---|
| AP 1 | 11 |
| AP 3 | 13 |
|  |  |

TERMINAL TYPE — 2200

| APPLICATION NAME (201) | START FLAG (202) | SERVICE DIAL NUMBER (203) | SUBSCRIBER TERMINAL TYPE (2204) |
|---|---|---|---|
| AP 1 | 0 | 11 | TERMINAL WITH DISPLAY |
| AP 3 | 1 | 13 | MULTIFUNCTIONAL TELEPHONE |
|  |  |  |  |

MESSAGE FORMAT FOR TERMINAL TYPE OF FIG. 22

- 2300
- 301 BASIC PART
  - CONNECTION IDENTIFIER
  - MESSAGE TYPE — 303
- 302 PARAMETER PART
  - APPLICATION IDENTIFIER — 304
  - SERVICE DIAL NUMBER — 405
  - TERMINAL TYPE — 406
  - — 2307

FIG. 24 CHECK USING TERMINAL TYPE IN TABLE OF FIG. 22

FIG. 25 SWITCHBOARD CONNECTED WITH PLURAL COMPUTERS

IDENTIFICATION OF COMPUTERS OF FIG. 25

| APPLICATION NAME | START FLAG | SERVICE DIAL NUMBER | COMPUTER IDENTIFIER |
|---|---|---|---|
| AP 1 | 0 | 11 | A |
| AP 3 | 1 | 13 | B |
|  |  |  |  |

MESSAGE FORMAT INCLUDING COMPUTER IDENTIFICATION INFORMATION

F I G. 30

| APPLICATION NAME | START FLAG | SERVICE DIAL NUMBER | FAULT FLAG |
|---|---|---|---|
| AP 1 | 0 | 11 | 0 |
| AP 3 | 1 | 13 | 1 |
| | | | | ns systems.

APPLICATION EXECUTION CONTROL METHOD AND SYSTEM FOR SERVICING SUBSCRIBERS VIA A SWITCHBOARD CONNECTED TO A COMPUTER USING AN APPLICATION MANAGEMENT TABLE

BACKGROUND OF THE INVENTION

The present invention relates to a communication network system, and more particularly to an application program execution control in a switching system in which a switchboard and a computer to provide services to subscribers are connected so that the software of the switchboard and the software of the computer cooperate with each other to execute the services to subscribers.

J. Shah, et al, "Application of a New Network Concept for Faster Service Deployment" CH25387/88/0000, 1988, pp. 1327–1331 and J. Rix-Broun, "The Telephone and the Terminal on Your Desk Join Forces", 1989, pp. 331–341 have disclosed a PBX system which is connected with a computer.

In regard to the conventional switching system of a type in which a switchboard and a computer are controlled by software of the switchboard and the software of the computer cooperating with each other to execute services, Proceedings of the Institute of Electronics, Information and Communication Engineers of Japan, SB-4-1, Autumn National Conference, 1989 has proposed a system which is constructed with 5 switchboards and m computers; and, in which the switchboards manage which computer executes individual application programs are executed upon generation of a request from a subscriber, and a switchboard determines a computer to be associated with the switchboard to control the corresponding application program and entrusts the determined computer with the control (proposal 1). This reference has further proposed a system in which the correspondence between individual application programs and computers to execute the application programs is managed by a specified computer and upon generation of a request from a subscriber the specified computer determines, through access from a switchboard, a computer to be associated with the switchboard to execute the corresponding application program and entrusts the determined computer with the control (proposal 2-1) and a system in which, upon generation of a request from a subscriber, a switchboard makes a reference to the specified computer in the proposal 2-1 to determine a computer to be associated with the switchboard to execute the corresponding application program and entrusts the determined computer with the control (proposal 2-b).

Also, JP-A-1-157192 has disclosed a system having a construction in which a plurality of computers are connected with one switchboard and a processor of the switchboard is provided with an application management section. The application management section analyzes or determines which of the computers is to execute an application the start of which is requested from a subscriber, and a start request is sent from the application management section to the determined computer. This system is basically similar to the system mentioned in the above proposal 1.

JP-A-157191 has disclosed a measure to counter the case where a circuit line connected to a subscriber terminal is disconnected during execution of a service by the cooperation of a switchboard and a computer, that is, a system in which a processor of the computer is provided with an application management section for storing the application number of an application under execution in a form corresponding to the terminal number of a subscriber terminal, so that, upon disconnection of a circuit line, the application management section terminates the execution of a portion of the relevant application for the corresponding subscriber.

SUMMARY OF THE INVENTION

An object of the present invention is to provide an application execution control in which application programs executed in a computer connected with a switchboard in accordance with requests from subscriber terminals of the switchboard can be started or stopped individually through an operation by an operator from a console of the computer, by an execution scheduling in the computer, by disconnection information or command from the switchboard, or the like.

Another object of the present invention is to provide an application execution control in which the addition, modification or deletion of an application program for a service to subscribers can be made at a computer side with no modification of the software of a switchboard connected with the computer.

Still another object of the present invention is to provide a system and method for application program execution control between a computer and a switchboard in which the computer can notify the switchboard of the start or stop of each of application programs executed in the computer.

A further object of the present invention is to provide a system and method for control between a switchboard and a computer in which an application program for a service to subscriber terminals to be executed in the computer connected with the switchboard, in order to provide a service to subscriber terminals, can be added with no modification of the software of an application management section.

A still further object of the present invention is to provide a control in which when a switchboard requests the execution of a service to a computer connected with the switchboard, the switchboard notifies a subscriber terminal that the corresponding application program cannot be started because of a fault or the like, that the corresponding application does not exist in the computer, or that the corresponding application cannot be executed due to the type of that subscriber terminal.

To that end, the present invention provides a system having an interface between a switchboard and a computer for communicating a message between the software of the switchboard and the software of the computer, the software of the switchboard and the software of the computer cooperating with each other to provide various services, in which a memory of the switchboard includes therein an application management table for indicating whether or not the execution of each of application programs for services to subscribers executed in the computer is possible. When the state of each application program executed in the computer changes, a control message indicative of the state change is sent from the computer to the switchboard. The switchboard stores the state of each application program into the application management table in accordance with the control message from the computer and refers to the application management table to perform an operation in response to a service request from a subscriber.

The computer sends an application start message to the switchboard, for example, when an application program to be executed in the computer is newly added or when an application program existing in the computer is started, and sends an application stop message to the switchboard when an application program existing in the computer is deleted or when an application program being run is stopped. Such a control message is produced by each application program which is prepared in the computer or an application controller in the computer which controls the execution of the application programs.

According to the application execution control system of the present invention, upon start or stop of each application program executed in the computer, an application control message is sent to the switchboard from each application program or a control program which controls the application programs. At the switchboard side, the state start or stop of each application program is stored in the application management table, thereby making it possible to judge whether or not the execution of a service requested from a subscriber is possible. Accordingly, in accordance with the present invention, (the operations or runnings of) application programs executed in the computer can be started or stopped individually through an operation by an operator from a console device of the computer or by a command from an application execution scheduler which is installed in the computer. At the switchboard side, on the other hand, the registration/deletion of each application into/from the application management table provided in the memory of the switchboard or the registration of the state of each application program, such as the start or stop operation thereof into the application management table, is made in accordance with the control message sent from the computer, thereby making it possible to know always the states of services (or application programs) which the computer can present (or execute) at the present time and hence making it possible to provide a dynamic service management.

In accordance with the present invention, in the case where an application program is newly added in the computer, the computer sends to the switchboard an application start message indicative of a dial number or a service number (hereinafter referred to as service dial number) to be inputted by a subscriber from his or her terminal in order to request a service which will be presented by the execution of the new application program. Thereby, the switchboard can effect registration of the new application and the service dial number into the application management table. Accordingly, on the basis of the contents of the application management table, the switchboard can, upon reception of a service guidance request from a subscriber, notify the subscriber of the kinds of services which can be presented at the present time and the service dial numbers which are to be inputted by the subscriber from his or her terminal when the subscriber requests those services.

According to the present invention, in the case where there is employed a construction in which a plurality of computers are connected with one switchboard so that services to subscribers are allotted to the plural computers, a computer identifier for identifying a computer to execute each application program is set in the above-mentioned control message and is stored in an application management table. When receiving a service request from a subscriber terminal, the switchboard can issue a request of the execution of the corresponding application program to a specified computer which should execute the corresponding application program. Thereby, a change of allotment of application programs between the plurality of computers is facilitated.

Also, according to the present invention, in the case where a switchboard detects a fault in a computer or an application program in a computer, the switchboard makes the registration of the presence of a fault into a registration area of an application management table corresponding to an application related to the fault, thereby making it possible to easily control the stopping of a specified service to a subscriber and the resumption of the service upon recovery from the fault.

BRIEF DESCRIPTION OF THE DRAWINGS

FIG. 1 is a block diagram showing an example of a switching system to which the present invention is applied;

FIG. 2 shows an example of the set contents of an application management table;

FIG. 3 shows the general format of a message communicated between a switchboard and a computer;

FIG. 4 shows the format of an application start message;

FIG. 5 shows the format of an application stop message;

FIG. 6 shows the sequence of a processing between a computer and a switchboard;

FIGS. 7 and 8 each shows a flow chart of the operation of an application management program section when an application management table is updated;

FIG. 9 shows a flow chart of the operation of an application management program section when it calls for an application upon request from a subscriber;

FIGS. 10 and 11 each shows a flow chart of the operation of an application section in the case where a computer sends an application start message to a switchboard;

FIG. 12 shows a flow chart of the operation of an application section in the case where a computer sends an application stop message to a switchboard;

FIG. 13 is a software block diagram of an application controller in a computer;

FIG. 14 shows an example of the set contents of a schedule management table provided in a memory of a computer;

FIG. 19 shows an example of the set contents of an application management table;

FIG. 30 shows an example of the set contents of an application management table.

DESCRIPTION OF THE PREFERRED EMBODIMENTS

Figure 15:
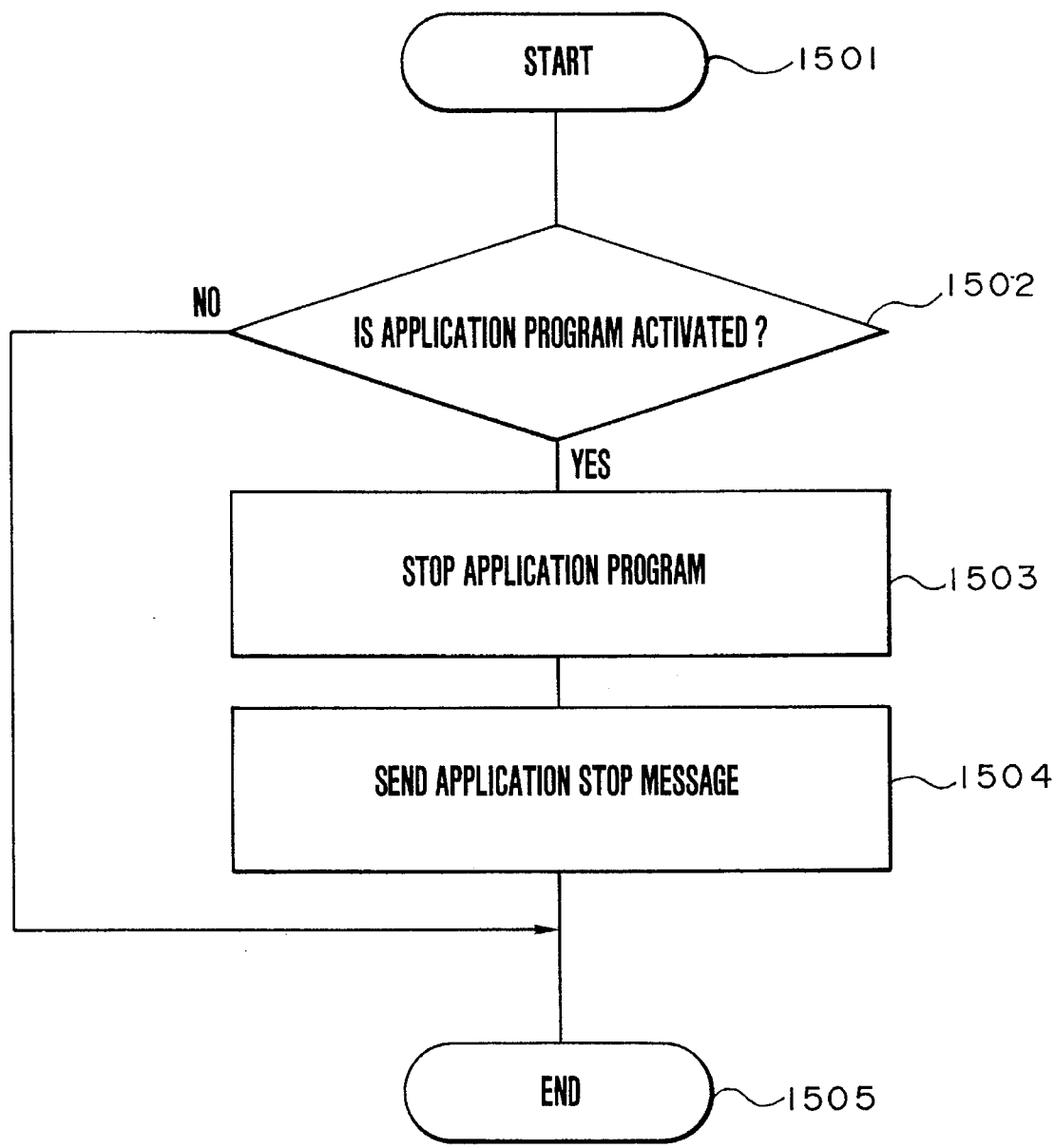
FIG. 15 shows a flow chart of the operation of an application section in the case where a computer sends an application start message to a switchboard.

Embodiments of the present invention will now be explained in detail on the basis of the accompanying drawings.

FIG. 1 is a block diagram showing an embodiment of a switching system to which the present invention is applied. In the figure, a switchboard 100 includes a switch device 101, a communication control unit 102, a processor 103 and a memory 104. The memory 104 includes therein an application management program section 105 and an application management table 200. Reference numerals 106 to 108 designate subscriber terminals connected to the switchboard 100. The switchboard 100 is connected with a computer 110 through the communication control unit 102 and a communication line 109.

The computer 110 is provided for executing application programs for services to subscribers and includes a communication control unit 111, a processor 112 and a memory 113. The memory 113 has therein an application section 114 which includes application programs 116 to 118 running on the computer 110 and an application controller 115. Reference numeral 119 designates a console device of the computer 110.

FIG. 2 shows the construction of the application management table 200 which is provided in the memory 104 of the switchboard 100 in order to effect registration of a start/stop of any one of the application programs 116 to 118 executed by the computer 110. The application management table 200 has a plurality of records each of which includes the name 201 of an application executed in the computer 110. Each record includes a start indication flag 202 which indicates whether or not each application program has been started (or is being activated) and a service dial number 203 which is to be inputted from each of the subscriber terminals 106 to 108 when a service presented by the corresponding application executed by the computer 110 is requested. In the present embodiment, the start indication flag 202 is set with "1" in the case where the application program has been started (or is being activated) and with "0" in the case where it has not been started (or is not being activated).

FIG. 3 shows the general format of a control message which is communicated between the application management program section 105 of the switchboard 100 and the programs 116 to 118 of the computer 110 through the application controller 115 of the computer 110. In the figure, reference numeral 301 represents a basic part which is common to individual messages and numeral 302 represents a parameter part which is different for each message. A connection identifier 303 of the basic part 301 is a number for identifying a communication connection which is formed upon each communication between the application management program section 105 of the switchboard 100 and the application section 114 of the computer 110, and a message type 304 of the basic part 301 identifies the function of a message being transferred, for example, connection, stop, message display or message lamp display.

FIG. 4 shows the message format 400 of an application start message which is one of control messages communicated between the application management program section 105 of the switchboard 100 and the application section 114 of the computer 110 and notifies the switchboard 100 of the start of each of the application programs 116 to 118 to be executed by the computer 110. In the figure, reference numeral 301 represents a basic part which is common to messages and numeral 302 represents a parameter part which is different for each message. Numeral 405 in the parameter part 302 represents an application identifier which identifies one of the individual application programs 116 to 118 executed by the computer 110, and numeral 406 represents a service dial number which is to be inputted from each of the subscriber terminals 106 to 108 of the switchboard 100 in requesting a service presented by the corresponding application which is to be executed by the computer 110 and is designated by the application identifier 405. In the message format 400, a plurality of sets of application identifiers 405 and service dial numbers 406 may be designated corresponding to a plurality of applications, respectively.

FIG. 5 shows the message format 500 of an application stop message for notifying the application management program section 105 of the switchboard 100 of the stop of any one of the application programs 116 to 118 executed by the computer 110. In the figure, reference numeral 301 represents a basic part which is common to messages and numeral 302 represents a parameter part which is different for each message. The application stop message may take the message format shown in FIG. 4 or may include a service dial number as a parameter.

FIG. 6 shows the sequence of a processing performed by the switchboard 100 for registration of start and stop into the application management table 200 of the memory 104 by reception of an application start message and an application stop message from the computer 110. When the application controller 115 of the application section 114 in the memory 104 shown in FIG. 1 is activated, the computer 110 sends a system start-up message 601 to the switchboard 100 through the communication control unit 111 and the communication line 109 to notify the switchboard 100 of the start-up of the system.

When receiving the system start-up message 601 through the communication control unit 102, the application management program section 105 in the memory 104 of the switchboard 100 sends to the computer 110 a response message 602 for notifying the computer 110 of the reception of the system start-up message 601. Each time any one of the application programs 116 to 118 of the computer 110 is started, the application controller 115 of the computer 110 sends to the switchboard 100 an application start message 400 for notifying the switchboard 100 of the start of that application program. When receiving the application start message 400, the application management program section 105 of the switchboard 100 makes the registration of a start into the application management table 200 of the memory 104 in regard to an application program designated by the application start message 400 and sends a response message 603 to the computer 110 after registration.

In the case where any one of the application programs 116 to 118 is stopped, the application controller 115 of the computer 110 sends to the switchboard 100 an application stop message 500 for notifying the switchboard 100 of the stop of the corresponding application program, in a manner similar to that upon start. When receiving the application stop message, the application management program section 105 of the switchboard 100 registers the stop of the application program designated by the message into the application management table 200 of the memory 104 and sends a response message 604 to the computer 110 after registration.

In the above example, the computer 110 sends a control message (an application start message 400 or an application stop message 500) to the switchboard 100 each time any one of the application programs 116 to 118 is started or stopped. However, in the case where the plurality of application programs 116 to 118 are simultaneously started or stopped, a pair of an application identifier and a service dial number may be added into a message 400 or a message 500 to be sent as a block the switchboard 100.

FIG. 7 shows a flow chart of the operation of a routine executed by the application management program section 105 of the switchboard 100 for updating the application management table 200 in the memory 104 when the application management program section 105 receives an application start message from the computer 110. When the application start message 400 from the computer 110 is received, a search of the application management table 200 is made for a record having an application name designated by an application identifier 405 included in the application start message 400 (step 702). As the result of search, the flow goes to step 704 in the case where the record having the designated application name is present in the table 200 and to step 706 in the case where it is not present (step 703).

In step 704, a start flag 202 in the record on the application management table 200 corresponding to the application identifier 405 is set to "1". In step 706, an additional record having the application identifier 405 designated by the application start message 400 as an application name is registered into a vacant record area of the application management table 20. In step 707, a start flag 220 of the additional record is set to "1" and a service dial number 406 designated by the application start message 400 is set into a service dial number area 203 of the additional record. In step 705, a response message 603 giving the notification of the completion of the above registration operation is sent to the computer 110, thereby completing the processing.

A route in FIG. 7 including steps 706, 707 and 705 shows that in the case where a new application program is added to the computer 110, the above-mentioned application name is registered into the application management table 200 of the switchboard 100. In this case, the application management program section 105 of the switchboard registers an application record on the application management table 200 and simultaneously makes the registration of start including the setting of the start flag 202 to "1". As an alternative, a method may be employed in which a registration identifier designating an item to be registered into the application management table 200 is provided as a parameter 302 of the application start message 400 shown in FIG. 4 and in which when the application management program section 105 of the switchboard receives the application start message 400 from the computer 110, the registration into the application management table 200 is made in accordance with the registration identifier.

FIG. 8 shows a flow chart of the operation of a routine executed by the application management program section 105 of the switchboard 100 for updating the application management table 200 when the application management program section 105 receives the above-mentioned application stop message 500 from the computer 110. When the application stop message 500 from the computer 110 is received, a search of the application management table 200 is made for a record having an application name corresponding to an application identifier 405 included in the application stop message 500 (step 802). As the result of this search, the flow goes to step 804 in the case where the corresponding record is present in the table 200 and to step 806 in the case where the corresponding record is not present (step 803).

In step 804, a start flag 202 of a record in the application management table 200 corresponding to the application identifier 405 is set to "0". In step 805, a response message 604 giving the notification of the completion of the above registration operation is sent to the computer 110. In step 806, a negative response message is sent notifying the computer 110 that an application corresponding to the application identifier 405 designated by the application stop message 500 has not yet been registered in the application management table 200 and hence the registration of stop is impossible.

Next, FIG. 9 shows a flow chart of the operation of a routine executed by the application management program section 105 of the switchboard 100 when the application management section 105 receives from one of the subscriber terminals 106 to 108 of the switchboard 100 a communication service number or service dial number for calling for an application to be executed by the computer 110. When a predetermined service dial number is received from a subscriber terminal, a search of the application management table 200 is made for a record having the predetermined service dial number (step 902). As the result of this search, the flow goes to step 904 in the case where the record having the predetermined service dial number is present in the table 200 and to step 906 in the case where the record is not present (step 903).

In step 904, a start flag 202 of the record having the predetermined service dial number is checked to judge whether or not the corresponding application program has been started (or is being activated). If the application program is being activated, the flow proceeds to step 905 in which the computer 110 is instructed to present a service of an application 201 corresponding to the service dial number. If the application program is not being activated, the flow proceeds to step 906 in which the subscriber terminal is notified that the application requested by the service dial number cannot be presented.

Next, the operation of the application section 114 of the computer 110 when it sends a control message, such as an application start message 400 or an application stop message 500 to the switchboard 100 by starting or stopping each of the application programs 116 to 118, will be explained in reference with FIGS. 10 to 16.

FIG. 10 shows the routine of a processing by the application controller 115 performed upon start-up of the computer 110. When the computer 110 is started up, the application controller 115 is activated (step 002). In step 1003, application programs in the application section 114 are started. In step 1004, a control message 400 indicative of the start of the application programs is sent to the switchboard 100. Whether or not the application programs are started is managed by a table in the application controller 115. The control message may be generated from each application program as started. This can be realized, for example, in such a manner that a parameter including the type (or start/stop) of a control message to be sent is given to each application program so that each application program operates in accordance with such a parameter.

In the above described processing routine, the application programs 116 to 118 are simultaneously started by the controller 115. However, there may be alternatively employed a method in which the application programs 116 to 118 are sequentially started in step 1003 and an application start message 400 is sent for every application program to the switchboard 100 in step 1004. As another alternative, a method may be employed in which application identifiers of all application programs started at the application section 114 of the computer 110 and dial numbers corresponding thereto are included as parameters in a system start-up message 601 shown in FIG. 6 for notifying the switchboard 100 of the activation of the application section 114 of the computer 110 and such a message is sent to the switchboard 100, thereby giving the notification of all the started application programs.

FIGS. 11 and 12 show the respective operations in the cases when the computer 110 sends an application start message 400 and an application stop message 500 to the switchboard 100 when an operator operating the computer 110 individually starts and stops application programs executed in the computer 110 by use of the console device 119 of the computer 110.

FIG. 11 shows a routine of the application controller 115 executed upon reception of an application program start instruction from the console device 119. Firstly, in step 1102, a judgement is made as to whether or not an application program, the start of which is instructed, has been started (or is being activated). In the case where the application program is being activated, the controller 115 completes the processing. In the case where the application program has been stopped, the controller 115 starts the application program in step 1103 and sends an application start message 400 to the switchboard 100 in step 1004, thereby completing the processing.

FIG. 12 shows a routine executed when a stop instruction for any application program is given by the operator from the console device 119 of the computer 110. In step 1202, the controller 115 judges whether or not an application program for which a stop instruction is given has been started (or is being activated). In the case where the application program has already been stopped, the processing is completed. In the case where the application program is being activated, the application program is stopped in step 1203 and an application stop message 500 is sent to the switchboard 100 in step 1204, thereby completing the processing. The application stop or start message may be sent from either the controller or the individual application.

FIGS. 13 to 16 are shown to explain an embodiment in which an application program execution scheduler is provided in the application section of the computer 110 and the start or stop of an application program in the computer is automatically made by the scheduler in accordance with a predetermined date or time so that an application start or stop message is sent from the computer 110 to the switchboard 100.

FIG. 13 shows a software block diagram of an application section 114 in the computer 110 for performing the above operation. The application section 114 includes an application controller 115, application programs 116 to 118, an application program execution scheduler 1300, and a schedule management table 1400.

FIG. 14 shows an example of set contents of the schedule management table 1400 which is used by the application program execution scheduler 1300. In the schedule management table 1400 are defined the name 1401 of an application executed in the computer and the activation term 1402 of each application program. The application program execution scheduler 1300 periodically refers to the schedule management table 1400 to execute a routine shown in FIG. 15 or 16 when there is found an application which reaches its start or stop instant of time.

FIG. 15 shows a routine executed in the case where any one of the application programs 116 to 118 is to be started by an instruction from the application program execution scheduler 1300. Firstly, in step 1502, the judgement is made of whether or not an application program for which a start instruction is given has been started (or is being activated). In the case where the application program is being activated, the processing is completed. In the case where the application program has been stopped, the application program is started in step 1503 and an application start message 400 is sent to the switchboard 100 in step 1504, thereby completing the processing.

Figure 16:
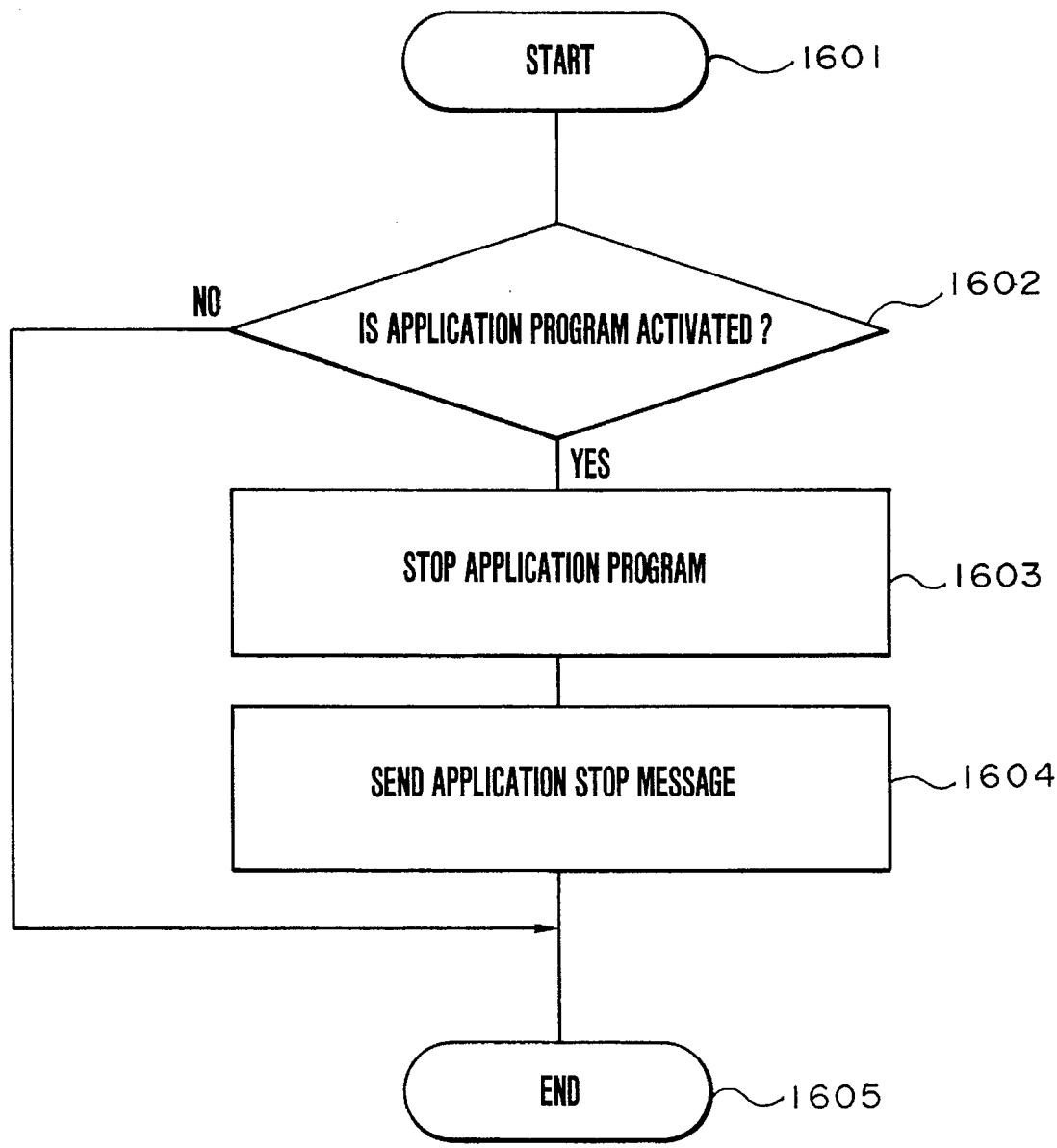
FIG. 16 shows a flow chart of the operation of an application section in the case where a computer sends an application stop message to a switchboard.

FIG. 16 shows a routine executed in the case where any one of the application programs 116 to 118 is to be stopped by an instruction from the application program execution scheduler 1300. When the application program stop instruction is received from the application program execution scheduler 1300, the judgement is firstly made of whether or not the application program for which the stop instruction is given has been started (or is being activated) (step 1602). In the case where the application program has already been stopped, the processing is completed. In the case where the application program is being activated, the application program is stopped in step 1603 and an application stop message 500 is sent to the switchboard 100 in step 1604, thereby completing the processing.

Next, explanation will be made of service dial numbers which are to be inputted from the subscriber terminals by users in order to enjoy services presented by application programs prepared in the computer 110. In FIG. 7 which has been explained, the management of service dial numbers is made by the application section 114 of the switchboard 100 and the application management program section 105 of the switchboard 100 performs the automatic registration (in step 707) of a service dial number in accordance with an application start message 400 sent from the computer 110. However, the management of service dial numbers can be made by the application management program section 105 of the switchboard 100. This will now be explained by use of FIGS. 17 and 18.

Figure 17:
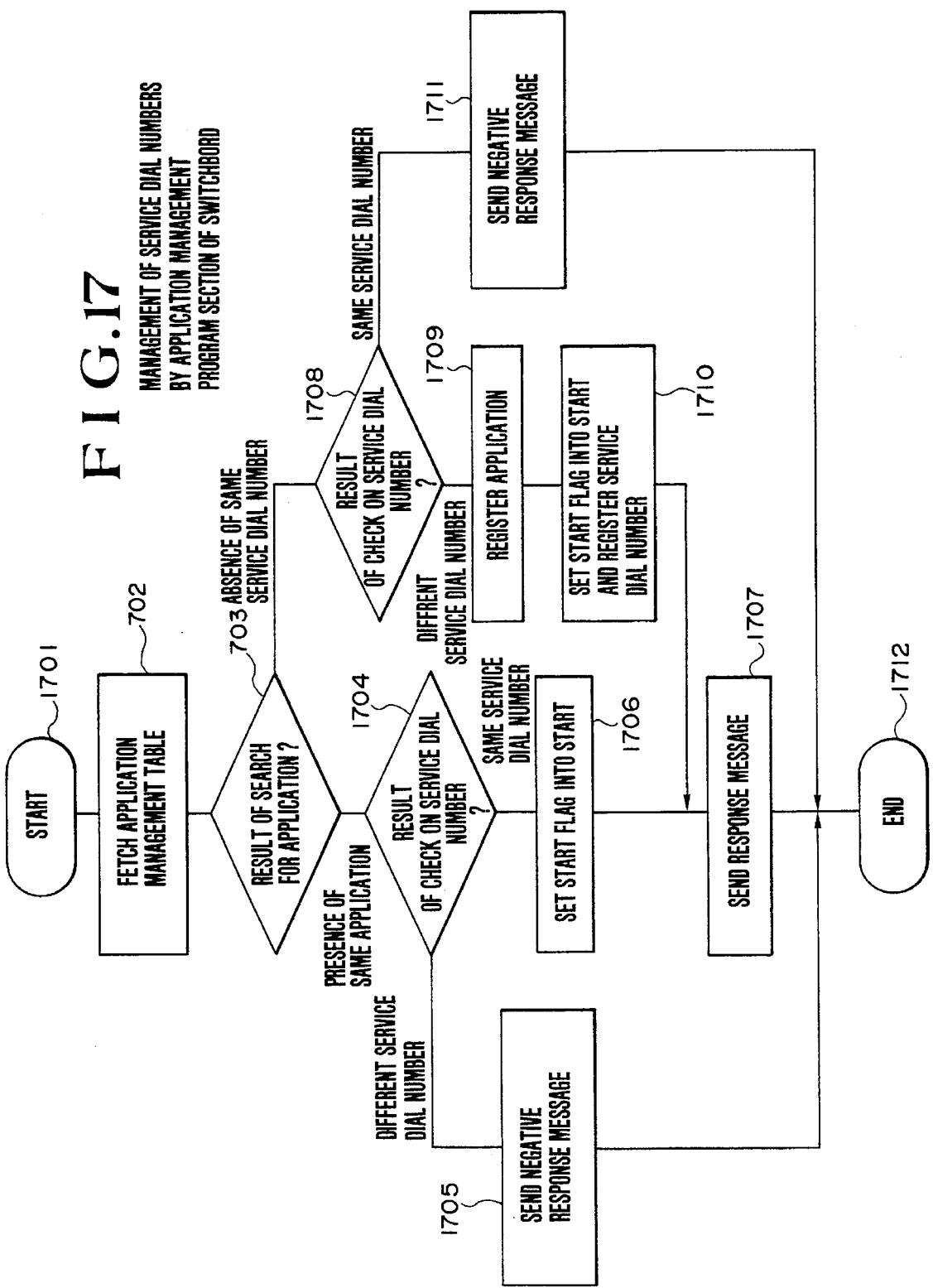
FIGS. 17 and 18 each shows a flow chart of the operation of an application management program section when an application management table is updated.

FIG. 17 shows a flow chart of the operation of a routine executed in the case where the application management program section 105 of the switchboard 100 manages service dial numbers when an application start message 400 is received from the computer 110. Steps 702 and 703 of the operation shown in FIG. 17 are similar to steps 702 and 703 in FIG. 7. As the result of an application search referring to the application management table 200, the flow goes to step 1704 in the case where the same application is present in the table 200 and to step 1708 in the case where the same application is not present.

In step 1704, the judgement is made of whether or not a service dial number corresponding to an application identifier 401 which has already been registered in the application management table 200 coincides with a service dial number 406 included in the application start message 400 received in step 1701. If a coincidence is not obtained, a negative response message giving the notification of the impossibility of the registration of start due to an anti-coincidence in service dial number is sent to the computer 110 (step 1705). If a coincidence is obtained, the flow goes to step 1706. In the case where the application designated from the computer has not yet been registered in the management table 200, a check is made of whether or not the same service dial number as the service dial number 406 included in the application start message 400 is used in another application which has already been registered in the management table 200 (step 1708). If the same service dial number is used, the flow goes to step 1711 because of a double assignment. If the same service dial number is not used, the flow goes to step 1709. Steps 1706 to 1710 of the operation shown in FIG. 17 are similar to steps 704 to 707 in FIG. 7.

Figure 18:
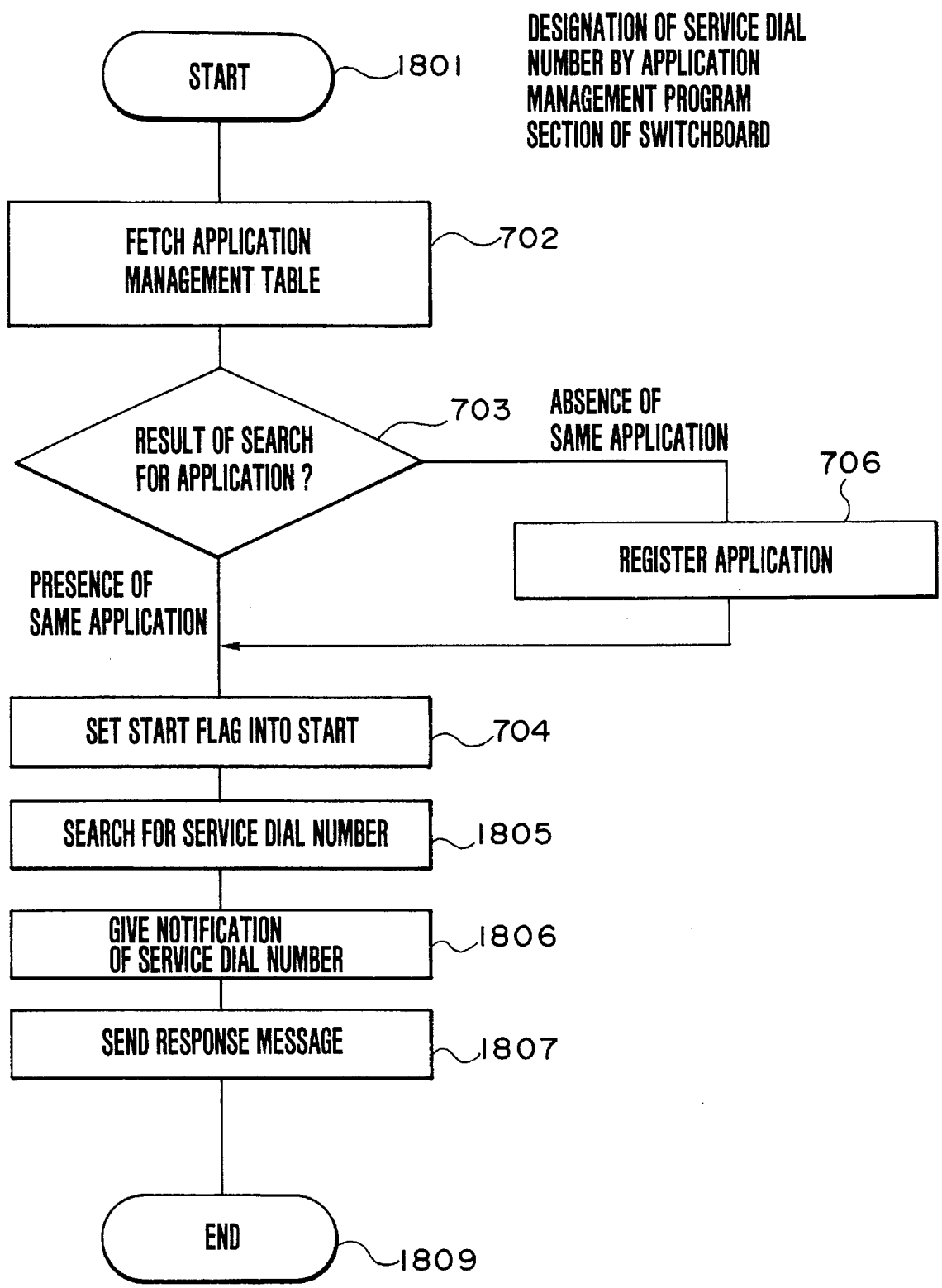

FIG. 18 shows a flow chart of the operation of an embodiment in which a service dial number 406 is not designated by an application start message 400 sent from the computer 110 to the switchboard 100, but can be designated by the application management program section 105 of the switchboard 100 after reception of the application start message 400 from the computer 110. Steps 702 to 706 of this routine, upon reception of the application start message, are similar to steps 702 to 706 in FIG. 7. After step 704, the flow proceeds to step 1805. In step 1805, a search for an unused service dial number is made referring to the application management table 200 and the search-out service dial number is assigned to the corresponding application. In step 1806, the service dial number is notified to the computer 110. Thereafter, the flow proceeds to step 1807 and the processing is completed.

FIG. 19 shows an application management table 1900 of the switchboard 100 in the case where only records indicating applications being activated are registered in the application management table and the record of a given application is deleted from the application management table when that application is stopped. The application management table 900 includes records each having an application name 1901 which indicates an application program having been started (or being activated) in the computer and a service dial number 1902 which is to be inputted by a user in order to request a service presented by the application program.

Figure 20:
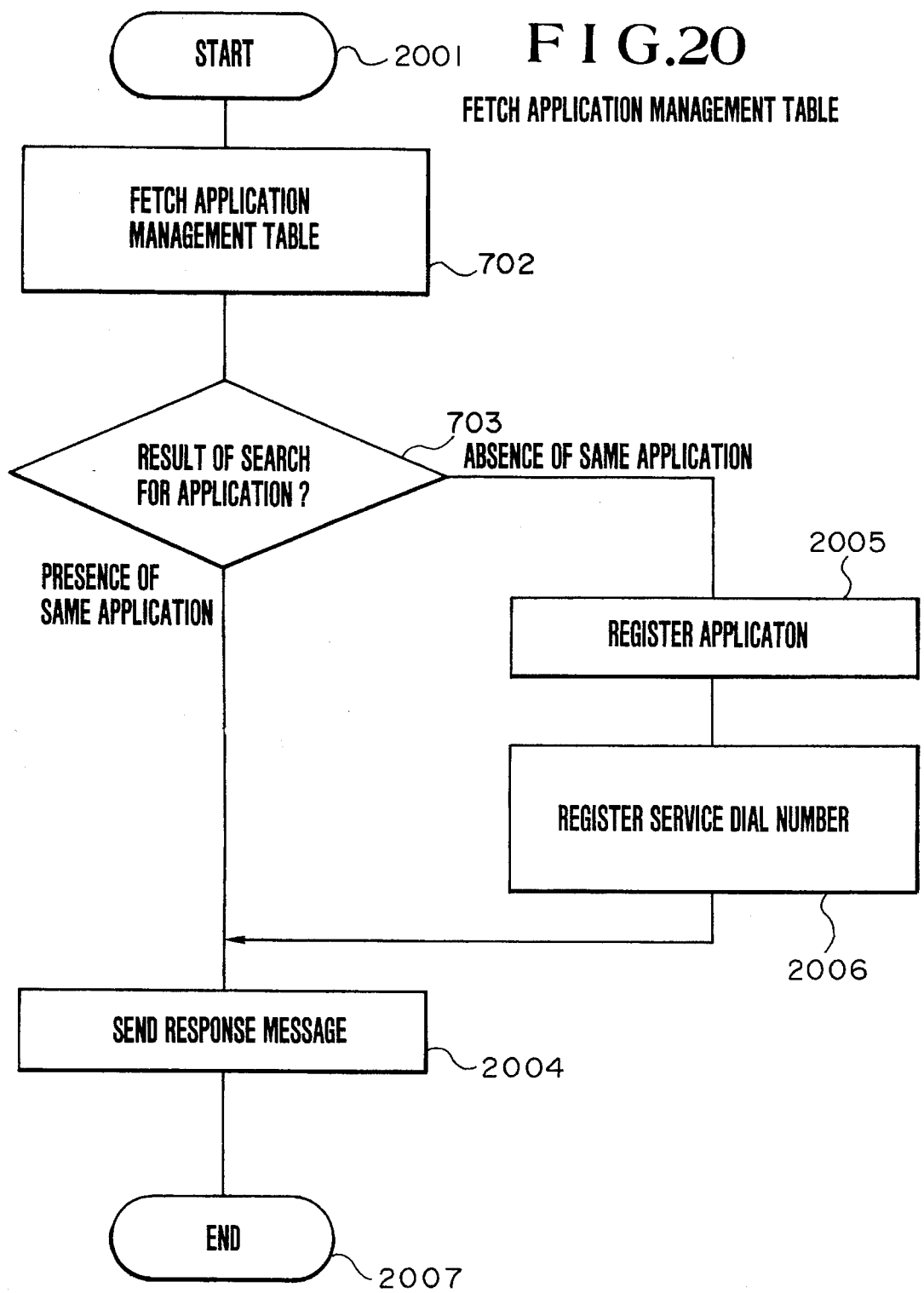
FIG. 20 shows a flow chart of the operation of an application management program section when an application management table is updated.

FIG. 20 shows a flow chart of the operation performed by the application management program section 105 of the switchboard 100 when the application management program section 105 receives an application start message 400 in the case where the application management table 1900 shown in FIG. 19 is used. Steps 702 and 703 in FIG. 20 are similar to steps 702 and 703 in FIG. 7. In the case where an application designated by the application start message 400 has already been registered in the application management table 1900 (step 703), a response message notifying the computer 110 of the completion of registration is sent to the computer 110 in step 2004, thereby completing the processing. On the other hand, in the case where the designated application has not been registered (step 703), a record having an application identifier 405 designated by the application start message 400 and a service dial number 406 is registered into the application management table 1900 in steps 2005 and 2006 and a response message is sent to the computer 110 in step 2004, thereby completing the processing.

In each of the foregoing embodiments, services capable of being presented by the switchboard 100 to subscribers or application programs capable of being executed by the computer 110 are dynamically registered and deleted. Therefore, if there is means for knowing which of the services can be presented at the present time, it is convenient to subscribers. Such means will now be explained in detail.

Figure 21:
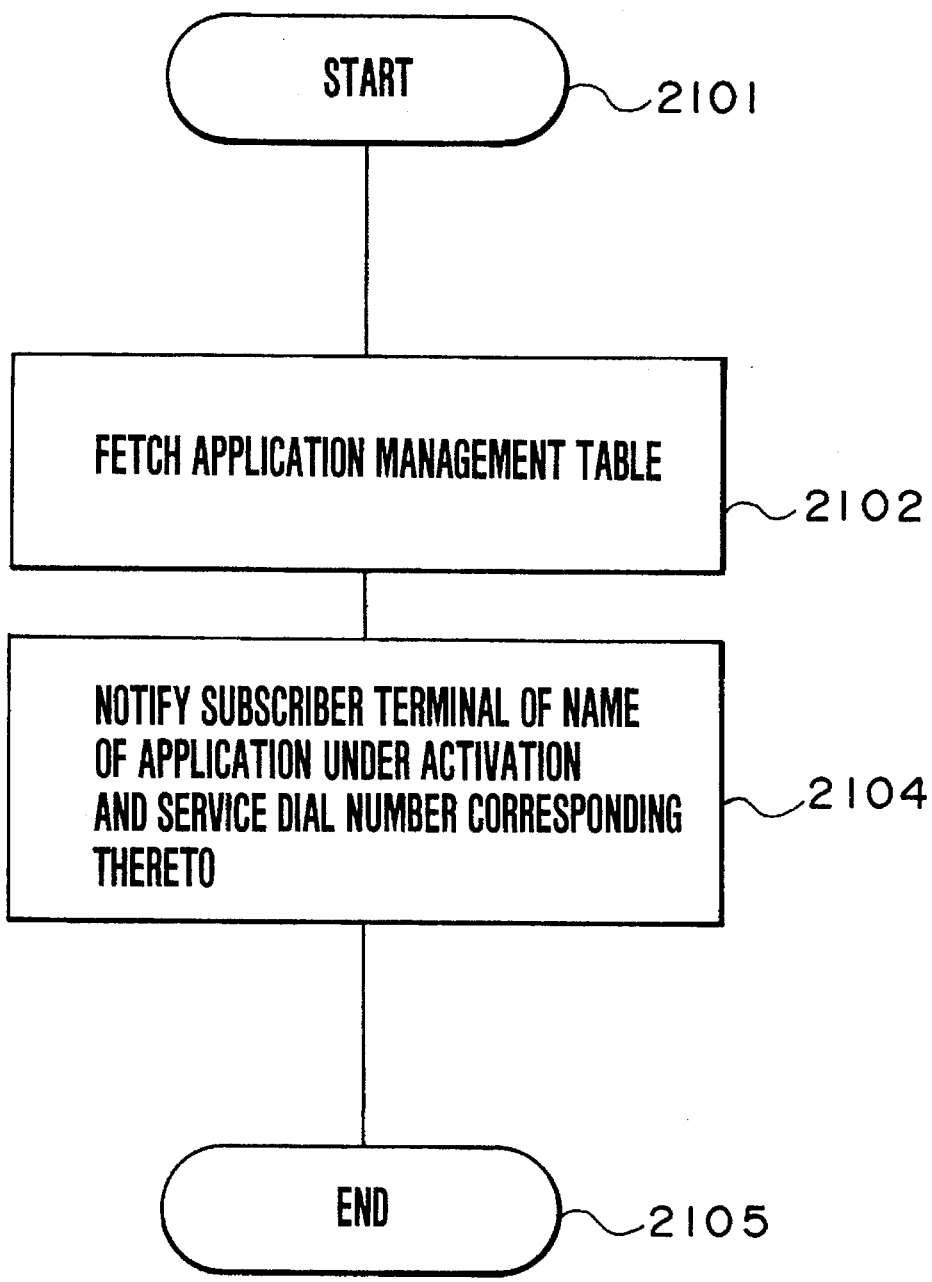
FIG. 21 shows a flow chart of the operation of an application management program section when it calls for an application upon request from a subscriber.

FIG. 21 shows a routine which the application management program section 105 of the switchboard 100 executes, upon reception of a request for the notice of the kinds of presently available services or applications under activation in the computer 110 from any one of the subscriber terminals 106 to 108 of the switchboard 100, in order to notify the subscriber terminal of the kinds of services (or applications) and service dial numbers corresponding thereto.

In the routine shown in FIG. 21, a search of the application management table 200 in the switchboard 100 is firstly made for an application record which has a start flag 201 set to "1" (step 2102). Next, the subscriber terminal is notified of an application name 201 of the application record which has the flag set to "1" and a service dial number 203 which corresponds to the application name 201 (step 2104). In the case where a plurality of services can be presented, the notification of application names and service dial numbers for the respective services may be given as a block or sequentially.

Next, explanation will be made of an embodiment of a control system for checking the kinds or types of subscriber terminals which can request services presented by application programs 116 to 118 which the computer 110 can execute.

Figures 22, 23:
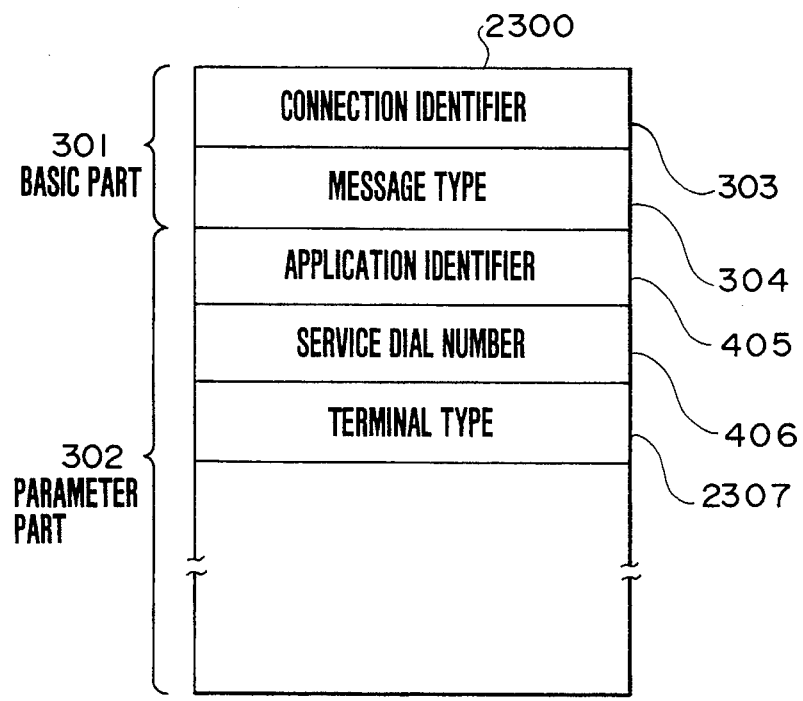
FIG. 22 shows an example of the set contents of an application management table.
FIG. 23 shows the format of an application start message.

FIG. 22 shows an example of an application management table 2200 which is provided in the memory 104 of the switchboard 100 and by which the kinds of subscriber terminals can be identified. Reference numerals 201 to 203 in FIG. 22 represent components similar to those represented by numerals 201 to 203 in FIG. 2, and numeral 2204 represents a subscriber terminal type designating the type of subscriber terminal to which a service can be presented by an application program indicated by the corresponding application name 201.

FIG. 23 shows the message format of an application start message 2300 in the present embodiment by which the computer 110 notifies the switchboard 100 of the start of an application program. In the figure, reference numerals 301 to 304, 405 and 406 represent components similar to those represented by numerals 301 to 304, 405 and 406 in FIG. 4, and numeral 2307 represents a subscriber terminal type code designating the type of subscriber terminal to which an application indicated by an application identifier 405 can present a service.

Figure 24:
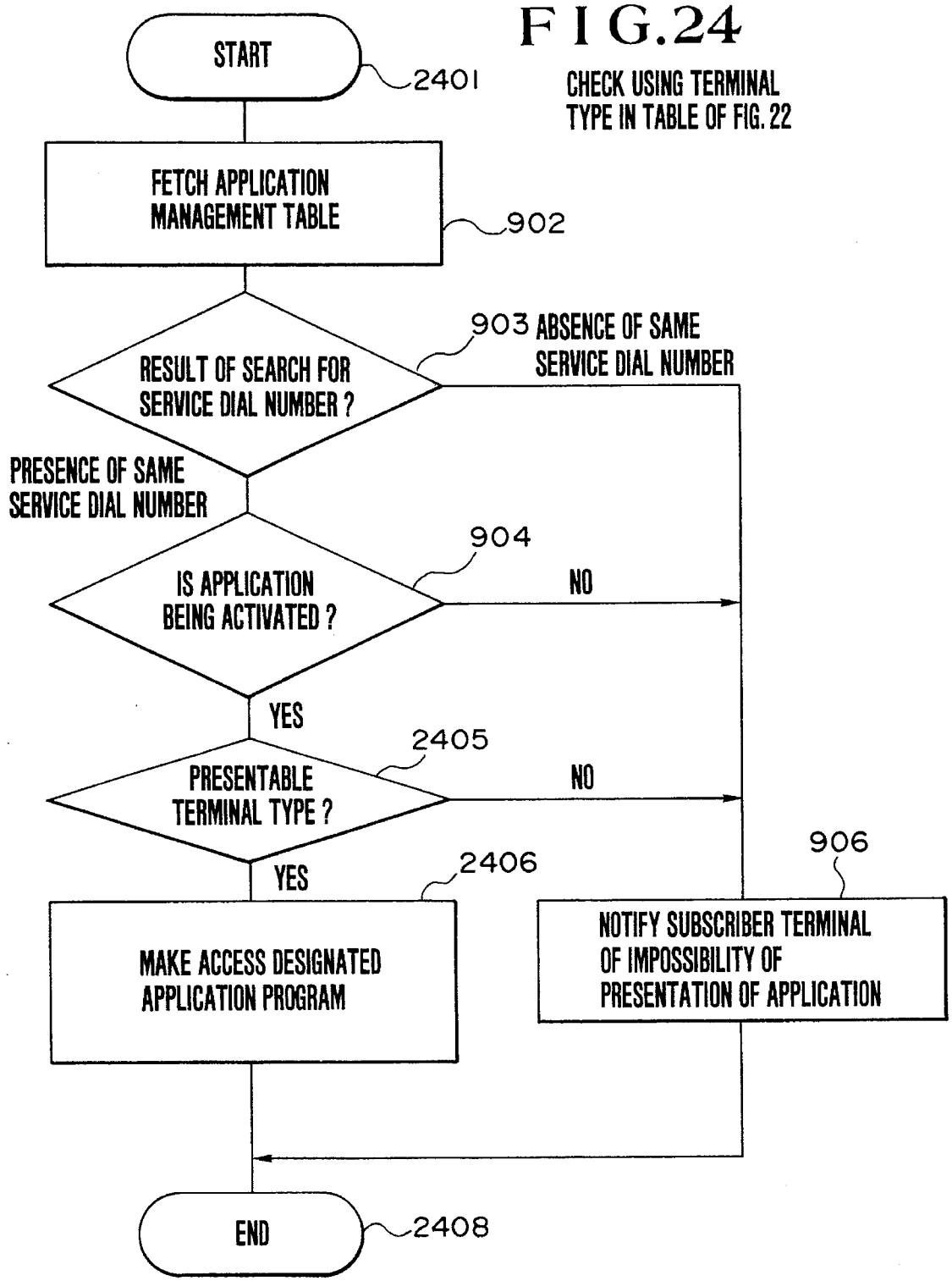
FIG. 24 shows a flow chart of the operation of an application management program section when it calls for an application upon request from a subscriber.

FIG. 24 shows a flow chart of the operation of a routine executed by the application management program section of the switchboard 100 when a service dial number for request of a service is received from any one of the subscriber terminals 106 to 108. In this operation, steps 902, 903, 904 and 906 are similar to steps 902, 903, 904 and 906 in FIG. 9. In the case where an application 201 corresponding to the service dial number received in step 2401 has been started (or is being activated) (step 904), the flow goes to step 2405. In step 2405, on the basis of the application management table 2200 fetched in step 902, the judgement is made of whether or not the service requesting subscriber terminal is of a terminal type to which the application corresponding to the service dial number received in step 2401 can provide a service. The flow goes to step 2406 if the terminal is of such a type and to step 906 if it is not of such a type. In steps 2406 and 906, operations similar to those in steps 905 and 906 in FIG. 9 are performed, thereby completing the processing.

Next, explanation will be made of an embodiment of the present invention in the case where a plurality of computers for service management are connected with one switchboard.

Figure 25:
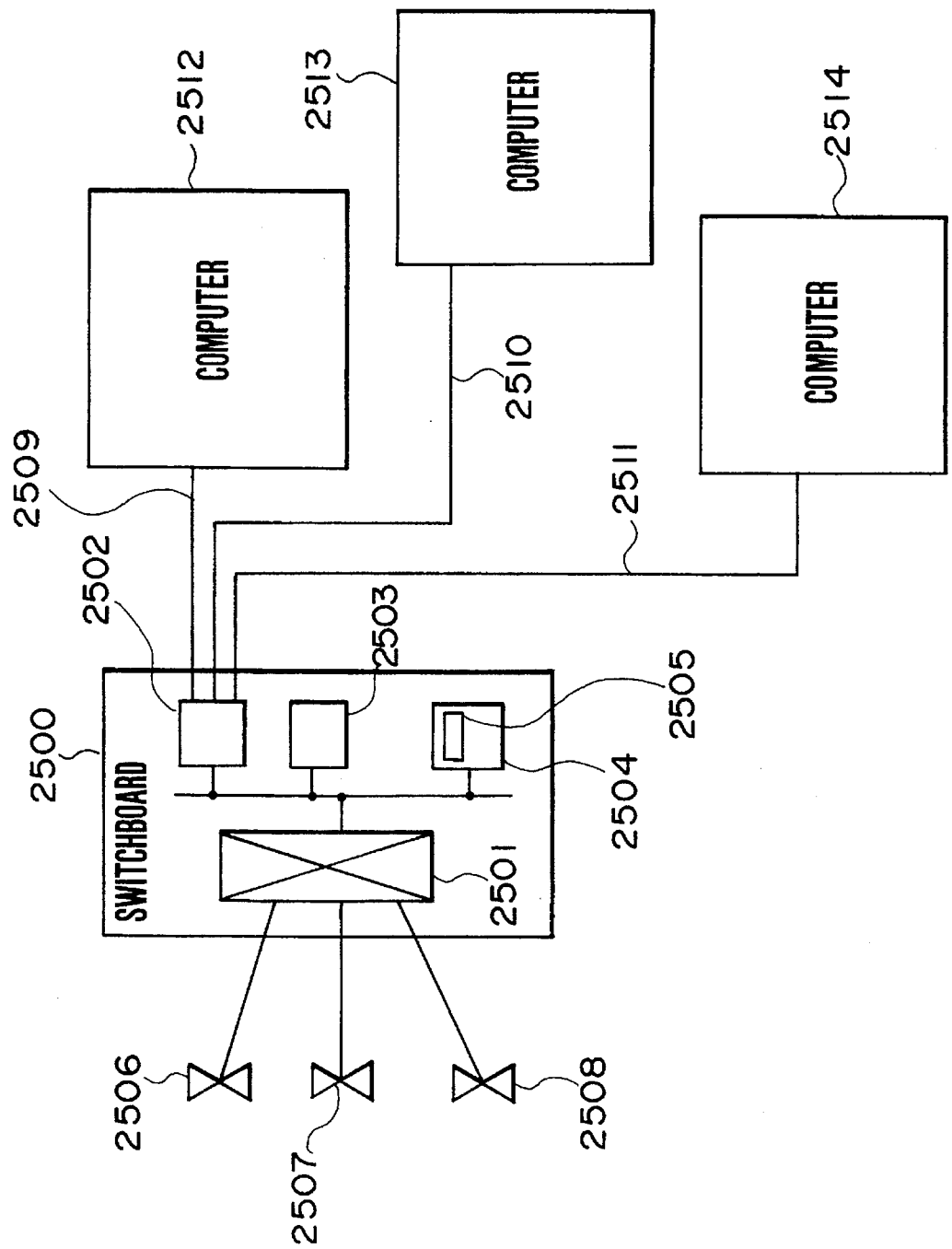
FIG. 25 is a diagram showing the connection of computers and a switchboard for explaining the start of an application program.
Figures 26, 27:
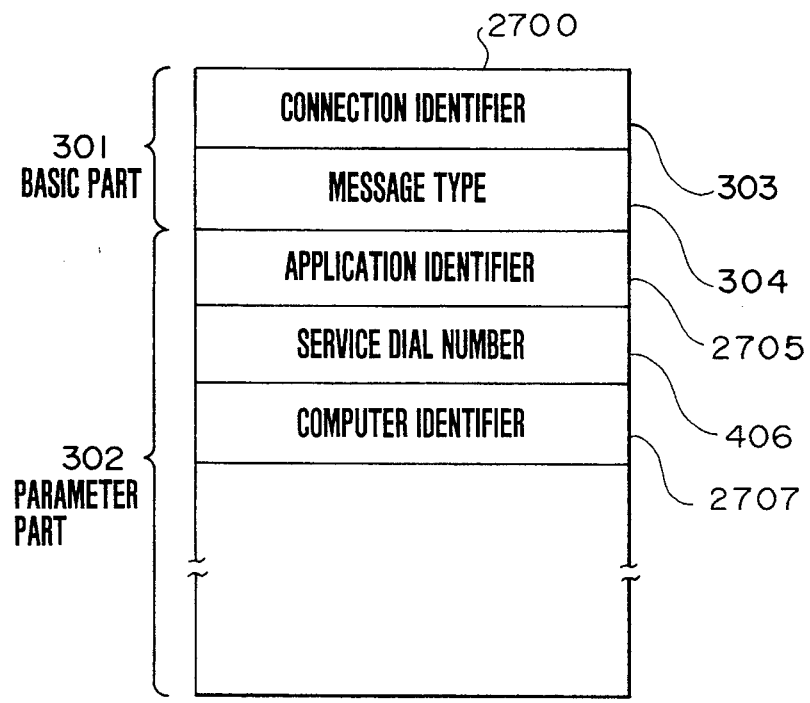
FIG. 26 shows an example of the set contents of an application management table.
FIG. 27 shows the format of an application start message.

FIG. 25 shows a block diagram of a system in the present embodiment. In FIG. 25, reference numeral 2500 designates a switchboard which includes a switch device 2501, a communication control unit 2502, a processor 2503 and a memory 2504. The memory 2504 includes therein an application management program section 2505 and an application management table 2600 (FIG. 26). The switchboard 2500 is connected with subscriber terminals 2506 to 2508. The PBX or communication control unit 2502 is connected with a computer 2512 through a communication line 2509, with a computer 2513 through a communication line 2510 and with a computer 2514 through a communication line 2511.

FIG. 26 shows an example of set contents of the application management table 2600 provided in the memory 2504 of the switchboard 2500. In the table 2600, reference numerals 201 to 203 represent components similar to those represented by numerals 201 to 203 in FIG. 2, and numeral 204 represents a computer identifier for identifying one of the computers 2512 to 2514 connected with the switchboard 2500.

FIG. 27 shows the message format of an application start message 2700 which is one of the messages communicated between the application management program section of the switchboard 2500 and application sections of the computers 2512 to 2514 and gives the notification of the start of each of the application programs executed by the computers. In the application start message 2700, reference numerals 301 to 304 and 406 represent components similar to those represented by numerals 301 to 304 and 406 in FIG. 4, and numeral 2707 represents a computer identifier for identifying one of the computers 2512 to 2514 connected with the switchboard 2500.

Figure 28:
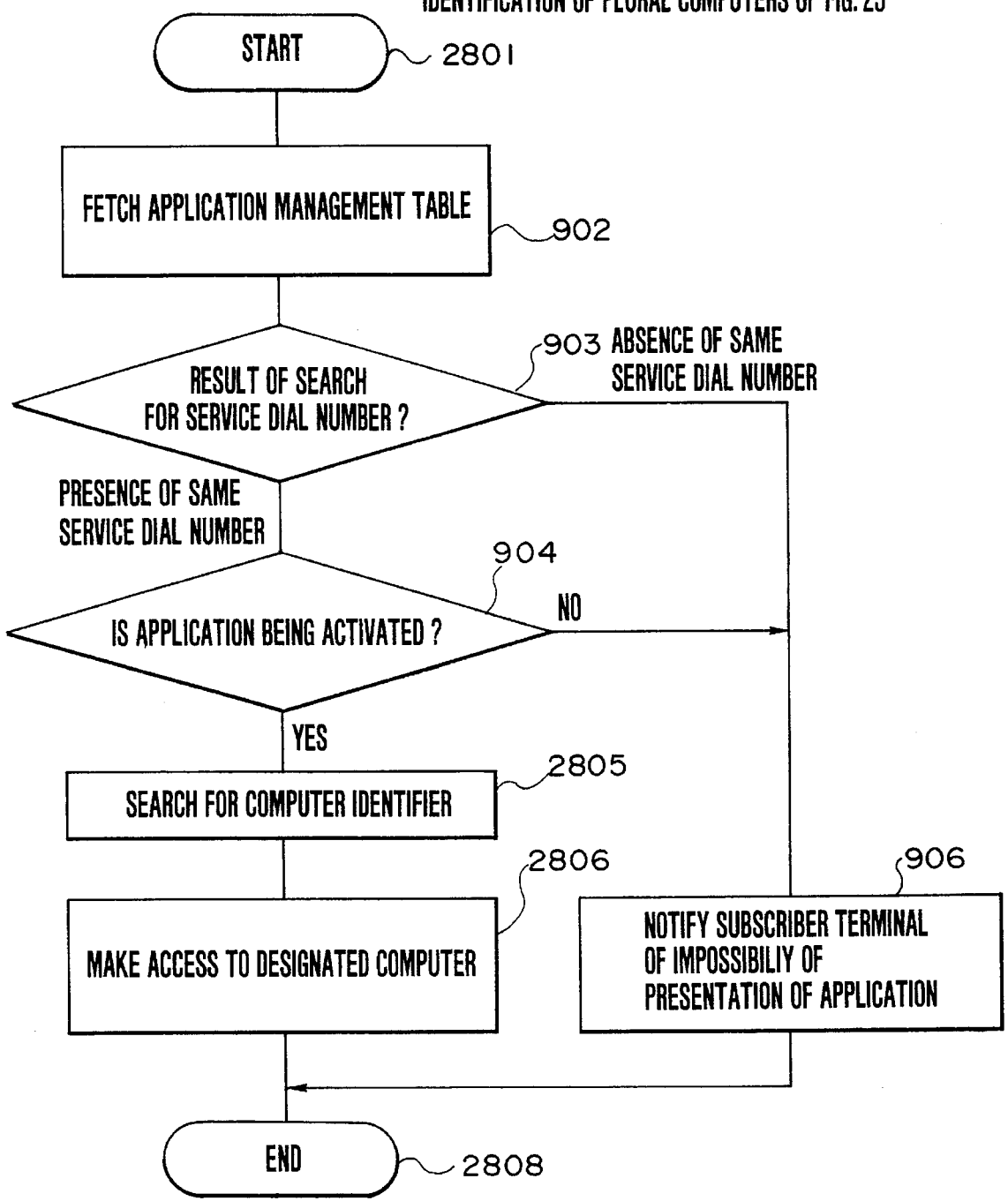
FIG. 28 shows a flow chart of the operation of an application management program section when it calls for an application upon request from a subscriber.

FIG. 28 shows a flow chart of the operation of a routine executed by the application management program section 2505 of the switchboard 2500 when a service dial number for requesting a service which an application executed by any one of the computers 2512 to 1514 presents is received from any one of the subscriber terminals 2506 to 2508 of the switchboard 2500. In this operation, steps 902, 903, 904 and 906 are similar to those in FIG. 9. In the case where an application corresponding to the service dial number received in step 2801 has been started or is being activated (step 904), the flow goes to step 2805.

In step 2805, a search for a computer identifier 2604 for a computer in which the application corresponding to the service dial number received in step 2801 is executed is made referring to the application management table 2600 fetched in step 902. In step 2806, the designated computer is requested to present a service, thereby completing the processing.

The switching system shown in FIG. 25 will now be explained by use of FIG. 29 in conjunction with an example in the case where the application management program section 2505 of the switchboard 2500 searches for applications registered in the application management table 2600 in the memory 2504 to give a stop instruction for an application program which is being stopped.

Figure 29:
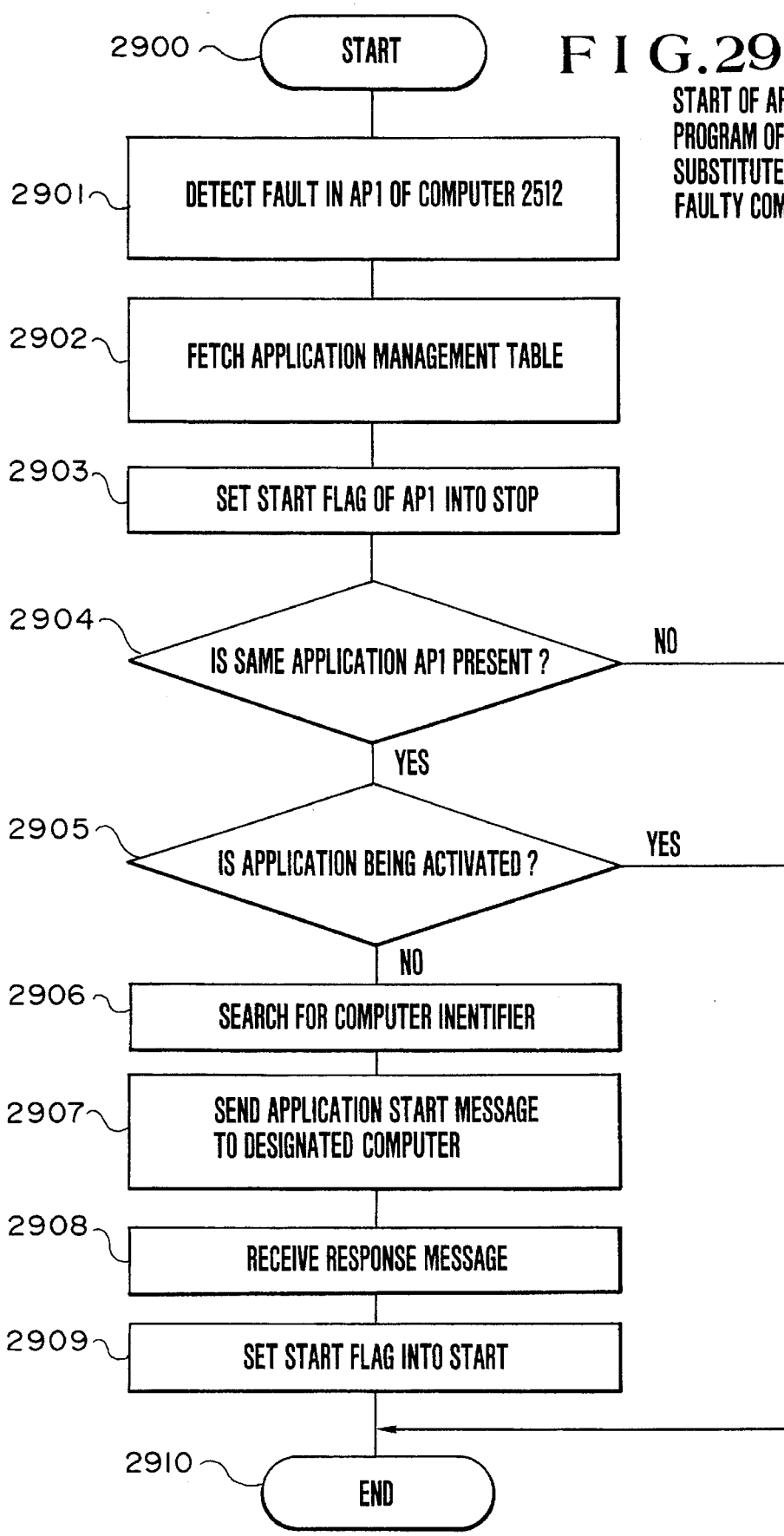
FIG. 29 shows a flow chart of the operation of an application management program section when a switchboard sends an application start message in order to start an application program in a computer.

FIG. 29 shows a flow chart of the operation of the application management program section 2505 of the switchboard 2500 in the case where the computers 2512 and 2513 shown in FIG. 25 have the same application program and the application program of the computer 2512 is usually activated but the application program of the computer 2512 is to be started because of a fault or the like. In this operation, when the switchboard 2500 detects a fault in the application (AP1) of the computer 2512 (step 2901), the flow proceeds to step 2902 in which the application management table 2600 is fetched from the memory 2504 of the switchboard 2500. In step 2903, a search for the application detected in step 2901 is made on the basis of the application management table 2600 fetched in step 2902 and the corresponding start flag is set to "0".

In step 2904, the examination is made of whether or not the same application as the in-fault application AP1 of the computer 2512 is present in the application management table 2600 fetched in step 2902. In the case where the same application is present, the flow goes to step 2905. In the case where the same application is not present, the processing is completed since it is not possible to present a desired application. In step 2905, the examination is made of whether or not the same application as the in-fault application AP1 of the computer 2512 searched out in step 2904 has been started or is being activated. In the case where the same application is being activated, the processing is completed. In the case where the same application is not being activated, the flow goes to step 2906.

In step 2906, using the application management table 2600 read in step 2902, a search is made for a computer identifier 2601 corresponding to the same application AP1 as the in-fault application AP1 of the computer 2512 in step 1904. In step 2907, an application start message is sent to the searched-out computer, which is in turn instructed to start the same application program AP1 as the in-fault application program AP1 of the computer 2512. In step 2908, a message giving the notification of the start of the application AP1 is received from the computer instructed in step 2907. A start flag corresponding to the application AP1 is set to "1" in step 2909, thereby completing the processing.

In the present embodiment, in the case where the switchboard detects a fault in a computer or an application program in a computer, a start flag in the application management table of the switchboard corresponding to an application which cannot be provided because of the fault is set to "0", thereby making the registration of stop. As an alternative, a method can be employed, for example, in which a switchboard has an application management table 3000 shown in FIG. 30. In FIG. 30, the application management table 3000 includes not only an application name 201, a start flag 202 and a service dial number 203 similar to those shown in FIG. 2, but also a fault flag 3004 set when the switchboard detects a fault in a computer or an application program in a computer. The fault flag 3004 is set to "1" when a fault is detected and "0" when the recovery from the fault is detected.

The above embodiments have been disclosed for the purpose of showing examples of the present invention and hence the present invention is never restricted to the disclosed embodiments.

We claim:

1. A system in which a switchboard connected to a plurality of subscriber terminals and a computer connected with said switchboard cooperate with each other to selectively execute services to subscribers, the system comprising:

means for storing an application management table in said switchboard in response to a control message sent from said computer, said application management table having a flag indicating whether or not the execution of an application for a service request sent from a subscriber terminal should be permitted;

means provided in said computer for sending a control message to said switchboard from said computer when the condition of possibility/impossibility of the execution of an application on said computer changes; and means provided in said switchboard for changing the content of said flag in said application management table in said switchboard on the basis of said control message.

2. A system according to claim 1, further comprising console means connected to said computer for inputting data which requests a start/stop of execution of any application executed in said computer.

3. A system according to claim 2, said computer further comprising means for controlling execution of applications and for sending said control message for application start/stop from said computer to said switchboard in accordance with application start/stop request data inputted from said console means.

4. A system according to claim 1, said computer further comprising means for storing a schedule management table for storing operating time information of respective operating time of a plurality of applications executed in said computer and a scheduler connected to said schedule management table for periodically referring to said operating time information to energize said control message sending means in accordance with the contents of said operating time information.

5. A system according to claim 1, further comprising application management means in said switchboard for referring to said application management table in response to a service execution request inputted from any subscriber terminal to request said computer to execute an application corresponding to the content of said service execution request when the flag is set and to notify said subscriber terminal of the impossibility of service execution when the flag is not set.

6. A system according to claim 1, said switchboard further comprising means for checking whether or not a service dial number inputted from any subscriber terminal coincides with one of a plurality of preliminarily held registration numbers, and for processing a service execution request inputted from said subscriber terminal only in the case where the inputted service dial number is included in said plurality of preliminarily held registration numbers.

7. A system according to claim 1, wherein said computer includes means for sending an application start message inclusive of an identifier for an application and a registration number to said switchboard upon start of execution of that application in said computer, and said switchboard includes means for storing said registration number when said switchboard receives said application start message.

8. A system according to claim 7, wherein said switchboard further includes notifying means for notifying said computer of said registration number and the identifier for the started application.

9. A system according to claim 8, wherein said notifying means send a message including said registration number to a subscriber terminal from which a service request for said application was inputted.

10. A system according to claim 1, wherein said computer includes means for notifying said switchboard of fault occurrence information when a fault occurs in said computer or said application and for notifying said switchboard of fault recovery information when the recovery from said fault is made, and said application management table stored in said switchboard includes a fault information table into which a flag indicating the situation of the fault is set or reset upon reception of the fault occurrence information or fault recovery information from said computer, respectively.

11. A system according to claim 10, further comprising:

at least one other computer which is other than said computer and is connected with said switchboard;

said application management table of said switchboard including a computer identification table for identifying a plurality of computers and means for identifying another application or computer with no faults which has an application to present a service requested from said subscriber terminal;

start message sending means for sending, when the other application or computer is present and the application to present the service requested from said subscriber terminal is not started, a start message requesting the start of execution of that application to said other computer.

12. A method for execution of services to subscribers in a system comprising a switchboard connected to a plurality of subscriber terminals and a computer connected with said switchboard, the method comprising:

a step of setting a flag, indicating whether or not the execution of an application for a service request sent from a subscriber terminal should be permitted, into an application management table stored in said switchboard in response to a control message sent from said computer;

a step of sending a control message from said computer to said switchboard when the condition of possibility/impossibility of the execution of an application by said computer changes; and a step of changing the content of said flag in said switchboard on the basis of said control message.

13. A method according to claim 12, further comprising a step of controlling execution of applications in said computer and sending an application start message or an application stop message from said computer to said switchboard in accordance with application start or stop request data inputted to said computer.

14. A method according to claim 12, further comprising a step of storing information of respective operating times of a plurality of applications executed in said computer into a schedule management table in said computer and a scheduling step of periodically referring to said operating time information to transmit said control message information from said computer in accordance with the contents of said information.

15. A method according to claim 12, further comprising a step of referring to said application management table in response to a service execution request inputted from any subscriber terminal to request said computer to execute an application corresponding to the content of said service execution request when the flag is set and to notify said subscriber terminal of the impossibility of service execution when the flag is not set.

16. A method according to claim 12, wherein said application management table includes a computer identification table for identifying a plurality of computer and the method further comprises a step of notifying said switchboard of fault occurrence information when a fault occurs in said computer or said application, a step of setting a flag indicative of the computer or application related to the fault into said application management table in response to said fault occurrence information, and a step of identifying another application or computer with no faults which has an application to present a service requested from said subscriber terminal.

17. An application execution control method in a system which has an interface between a switchboard and a computer for communicating a message under software control between said switchboard and said computer and in which said switchboard and said computer cooperate with each other to execute services to subscribers, the method comprising:

a step of storing in said switchboard an application management table indicating whether or not the execution of each of application programs for services to subscribers executed in said computer should be permitted;

a step of sending, for each of said application programs in said computer which undergoes a change in an execution state, a control message indicative of the change in state of execution of the application program from said computer to said switchboard;

a step of storing the state of execution of each application program into said application management table in accordance with said control message; and a step of referring to said application management table in said switchboard in the operation of the switchboard in response to a service request from a subscriber.

18. An application execution control method according to claim 17, wherein said control message includes an application start message and application stop message, and wherein for each application program executed in said computer, said computer sends an application start message to said switchboard upon activation of the application program and upon start of execution of the application program, respectively, and sends an application stop message to said switchboard upon deletion of the application program from said computer and upon stop of execution of the application program, respectively.

19. An application execution control method according to claim 17, wherein an operator operating said computer starts or stops individually the application programs executed in said computer by use of a console device of said computer.

20. An application execution control method according to claim 17, wherein said computer includes therein a schedule management table in which information of the operating time of each application program executed in said computer is stored and an application execution scheduler, and including the step of automatically starting or stopping an application program executed in said computer in accordance with the operating time information stored in said schedule management table.

21. An application execution control method according to claim 17, wherein said switchboard sends a control message indicative of the start or stop of execution of an application program to said computer on the basis of control information which is preliminarily registered in said application management table.

22. An application execution control method according to claim 17, wherein when a request for any service presented by the execution of an application program is received from a subscriber terminal, said switchboard refers to said application management table to judge whether or not the execution of the requested application program is possible and makes a request for the execution of an application program corresponding to said service to said computer or the notification of impossibility of presentation of said service to said subscriber terminal in accordance with the result of judgement.

23. An application execution control method according to claim 17, wherein, when a subscriber makes a service request by inputting from a subscriber terminal a service dial number which is preliminarily defined in said application management table corresponding to said service, said switchboard requests said computer to execute a predetermined application program for presentation of a service corresponding to the service dial number received from the subscriber terminal only in the case where said service dial number is registered in said application management table.

24. An application execution control method according to claim 17, wherein, when a control message indicative of the start of any application program is received from said computer, said switchboard assigns a service dial number unregistered in said application management table to an application program indicated by said message and notifies said computer of a correspondence between the application program and the service dial number.

25. An application execution control method according to claim 17, wherein said switchboard refers to said application management table in response to a service guidance request from a subscriber to notify said subscriber of the contents of executable services and service dial numbers which are to be inputted from a subscriber terminal by said subscriber in order to call for said services.

26. An application execution control method according to claim 17, wherein a said control message sent from said computer to said switchboard includes control information for specifying the type of subscriber terminal to which a service by an application program can be presented, wherein upon reception of said control message from said computer, said switchboard registers into said application management table the kind of an application program which is to be executed in response to a service request from a subscriber and the type of subscriber terminal to which a service by the application program can be presented, and wherein upon reception of the service request from the subscriber said switchboard checks a relation thereof with the subscriber terminal type registered in said application management table so that the determination of whether or not an application program execution request for presentation of the requested service should be issued to said computer is made on the basis of said subscriber terminal type and the result of said check.

27. An application execution control method according to claim 17, wherein said switchboard is connected with a plurality of computers and said control message includes a computer identifier for identifying one of said computers by which said application program is to be executed, and wherein when receiving a control message indicative of the start or stop of execution of an application program from any one of said computers, said switchboard registers into or deletes from said application management table a relation between the application program and a computer identifier for the computer by which the application program is to be executed.

28. An application execution control method according to claim 17, wherein said application management table includes an area for registration of the presence/absence of a fault in correspondence to each application program, wherein when detecting a fault in said computer or in an application program in said computer, said switchboard registers information indicative of the presence of a fault into the registration area of said application management table corresponding to an application program related to the fault, and wherein when the recovery from the fault is made, said switchboard registers information of the absence of a fault into the registration area of said application management table.

29. An application execution control method according to claim 17, wherein when said computer is started up, a system start-up message is sent from said computer to said switchboard, the content of a service presentable by said computer is notified to said switchboard by means of said system start-up message, and said computer updates said application management table in accordance with the content of said system start-up message.

30. A switchboard which is connected with a plurality of subscriber terminals and a computer and executes services to subscribers in cooperation with said computer, the switchboard comprising:

means for storing an application management table, having a flag indicating whether or not the execution of an application for a service request sent from a subscriber terminal should be permitted, in response to a control message sent from said computer; and means for changing the content of said flag on the basis of a control message which indicates a change of the condition of possibility/impossibility of the execution of an application in said computer.

* * * * *